US012756248B2

(12) United States Patent
Koch et al.

(10) Patent No.: US 12,756,248 B2
(45) Date of Patent: Oct. 6, 2026

(54) STATOR ARRANGEMENT FOR A RADIAL FLUX MOTOR

(71) Applicant: BorgWarner Inc., Auburn Hills, MI (US)

(72) Inventors: Silvio Koch, Kirchheimbolanden (DE); Benedikt Hummel, Zweibruecken (DE)

(73) Assignee: BorgWarner, Inc., Auburn Hills, MI (US)

( * ) Notice: Subject to any disclaimer, the term of this patent is extended or adjusted under 35 U.S.C. 154(b) by 205 days.

(21) Appl. No.: 18/240,030

(22) Filed: Aug. 30, 2023

(65) Prior Publication Data

US 2025/0030282 A1 Jan. 23, 2025

(30) Foreign Application Priority Data

Jul. 21, 2023 (DE) ..................... 10 2023 119 282.5

(51) Int. Cl.

| | |
|---|---|
| ***H02K 15/12*** | (2025.01) |
| ***F04D 25/06*** | (2006.01) |
| ***H02K 1/14*** | (2006.01) |
| ***H02K 1/18*** | (2006.01) |
| ***H02K 21/22*** | (2006.01) |

(52) U.S. Cl.

CPC ............. *H02K 1/187* (2013.01); *F04D 25/06* (2013.01); *H02K 1/146* (2013.01); *H02K 15/12* (2013.01); *H02K 21/22* (2013.01)

(58) Field of Classification Search

CPC .......... H02K 1/187; H02K 15/12; H02K 1/27; H02K 1/2786; H02K 1/2787; H02K 1/2788; H02K 1/279; H02K 1/2791

USPC ............................................................ 310/45

See application file for complete search history.

(56) References Cited

U.S. PATENT DOCUMENTS

| | | | | | |
|---|---|---|---|---|---|
| 3,382,383 | A * | 5/1968 | Turk | H02K 5/1285 | 310/86 |
| 4,647,803 | A * | 3/1987 | von der Heide | H02K 5/24 | 310/90 |
| 6,104,570 | A * | 8/2000 | Pelstring | H02K 7/16 | 360/99.08 |
| 6,359,354 | B1 * | 3/2002 | Watanabe | F04D 25/0693 | 310/43 |
| 6,437,464 | B1 * | 8/2002 | Neal | H02K 21/24 | 310/43 |
| 6,583,532 | B2 * | 6/2003 | Hein | H02K 9/223 | 310/43 |
| 6,924,575 | B2 * | 8/2005 | Baumeister | H02K 1/187 | 310/216.011 |

(Continued)

FOREIGN PATENT DOCUMENTS

EP 3940238 * 1/2022 ............. F04D 17/10

*Primary Examiner* — Burton S Mullins

(74) *Attorney, Agent, or Firm* — Patent Central LLC; Stephan A. Pendorf; Eric L. Doyle

(57) ABSTRACT

A stator arrangement (10) for a radial flux motor (100) having an axis of rotation (100*a*). The stator arrangement (10) comprises a stator housing (20), a stator (40) and an encapsulation body (50). The stator housing (20) defines a circumferential portion (30) for receiving the stator. The stator (40) is arranged on the circumferential portion (30). Furthermore, the stator (40) is encapsulated in the stator housing (20), wherein the encapsulation body (50) is form-fittingly connected to the stator housing (20) in such a manner that the stator (40) is secured at least in the axial direction (2) in the stator housing (20) by the encapsulation body (50).

14 Claims, 7 Drawing Sheets

(56) References Cited

U.S. PATENT DOCUMENTS

| | | | | |
|---|---|---|---|---|
| 8,192,815 | B2 * | 6/2012 | Weber | B23K 26/382 428/35.8 |
| 9,869,321 | B2 * | 1/2018 | Ishihara | H02K 5/12 |
| 10,491,060 | B2 * | 11/2019 | Wang | H02K 21/22 |
| 10,530,213 | B2 * | 1/2020 | Kitamura | H02K 15/12 |
| 10,615,675 | B2 * | 4/2020 | Aoi | H02K 15/14 |
| 11,025,106 | B2 * | 6/2021 | Sekii | H02K 3/522 |
| 11,522,410 | B2 * | 12/2022 | Takakuwa | H02K 5/08 |
| 11,664,698 | B2 * | 5/2023 | Uchino | H02K 5/04 416/175 |
| 2012/0007453 | A1 * | 1/2012 | Leiber | H02K 1/20 310/43 |
| 2018/0337567 | A1 * | 11/2018 | Yamasaki | H02K 5/10 |

* cited by examiner

STATOR ARRANGEMENT FOR A RADIAL FLUX MOTOR

TECHNICAL FIELD

The present disclosure relates to a stator arrangement for a radial flux motor. In particular, the disclosure relates to a radial flux motor for a fan, in particular a high-voltage fan, having a stator arrangement of this kind, and to a high-voltage fan having a corresponding radial flux motor. Furthermore, a cooling system having a corresponding high-voltage fan is disclosed. In addition, the present disclosure relates to a method for producing a stator arrangement for a radial flux motor.

BACKGROUND

Electric machines have long been used for the production of kinetic energy in many technical fields. An electric machine (also called an electric motor or E-motor) is an electric device that can convert electrical energy into mechanical energy. The mechanical energy can in turn be used to generate kinetic energy, with which other devices can be driven. Here, the electric motor generally comprises a stator and a rotor, which are accommodated in a motor housing. The stator is fixed in its position. The rotor moves relative to the stator and is usually situated on a drive shaft that rotates together with the rotor. The rotational energy can be transmitted to other devices via the shaft. Most electric motors generate energy with a magnetic field and a winding current.

In principle, it is possible to draw a distinction between radial flux machines and axial flux machines:

In axial flux machines, the rotor generally consists of a disc-shaped rotor body with two circular surfaces, wherein, normally, at least two permanent magnets are attached to at least one of the latter. The stator is generally of disc-shaped configuration and is arranged in a fixed manner at an axial distance from the rotor. On its side facing the rotor, the stator carries a plurality of circumferentially distributed winding elements. Each winding element in each case comprises a stator tooth, which extends in the axial direction from a stator yoke toward the rotor. The stator tooth is wound with a wire consisting of a metallic, highly conductive material in order to form the winding. When current is applied to the windings, the rotor, which is fastened to the output shaft of the motor, is subjected to a torque resulting from the magnetic field, wherein the generated magnetic flux in an axial flux machine is an axial flux. In axial flux machines, the rotor and the stator are spaced apart in the axial direction by an axial gap and are therefore also frequently referred to as axial gap machines.

In radial flux machines, the rotor generally consists of a cylindrical body, the entire circumference of which carries magnets. The stator is generally of hollow-cylindrical design and surrounds the rotor at a radial distance. Radial flux machines of this kind are also referred to as radial flux machines having an internal rotor (or radial flux machines having an external stator). Alternatively, radial flux machines can also be formed with an external rotor. That is to say that the stator is internal and is surrounded by a hollow-cylindrical rotor. On its inner side (with an internal rotor) or outer side (with an external rotor), the stator carries a plurality of circumferentially distributed winding elements. Each winding element in each case comprises a stator tooth, which extends in the radial direction from a stator yoke toward the rotor. The stator tooth is wound with a wire consisting of a metallic, highly conductive material in order to form the winding. When current is applied to the windings, the rotor, which is fastened to the output shaft of the motor, is subjected to a torque resulting from the magnetic field, wherein the generated magnetic flux in a radial flux machine is a radial flux.

The continuous further development of electric motors and the trend toward the use of electric current as an energy carrier and source is leading to a continuous expansion of the application portfolio of electric motors. Electric motors are used not only in small electronic devices such as notebooks or household appliances, which are usually operated in the low-voltage range. Increasingly, electric motors in larger dimensions are also being used in the high-voltage range at operating voltages of up to 800 volts or 850 volts and more.

Electric motors, especially in high-voltage applications, generally generate heat during operation. In addition, a positionally precise fixing of the stator relative to the rotor is important. In particular, forces acting during operation, for example magnetic forces between the rotor and stator or heat-induced temperature expansions, for example in the stator, constitute further challenges.

It is the object of the present invention to provide a stator arrangement for a radial flux motor with reliable fastening of the stator.

SUMMARY OF THE INVENTION

The present disclosure relates to a stator arrangement for a radial flux motor. In particular, the disclosure relates to a radial flux motor for a fan, and to a high-voltage fan having a corresponding radial flux motor. Moreover, the present disclosure relates to a cooling system having a corresponding high-voltage fan and to a method for producing a stator arrangement for a radial flux motor.

The stator arrangement according to the invention for a radial flux motor having an axis of rotation comprises a stator housing, a stator and an encapsulation body. The stator housing defines a circumferential portion for receiving the stator. The stator is arranged on the circumferential portion and is encapsulated in the stator housing. The encapsulation body is form-fittingly connected to the stator housing in such a manner that the stator is fixed at least in the axial direction in the stator housing by the encapsulation body. In particular, the encapsulation body is form-fittingly connected to the stator housing in such a manner that the stator is fixed in a form-fitting and/or friction-locking manner at least in the axial direction in the stator housing by the encapsulation body. In particular, the stator is at least partially embedded radially, axially and/or in the circumferential direction in the encapsulation body in such a manner that the stator is secured radially, axially and/or in the circumferential direction in the encapsulation body. In addition, it is possible to reduce the variety of designs required for the stator housing. For example, a single stator housing design may be sufficient for different power variants.

In refinements of the stator arrangement, the encapsulation body can be form-fittingly connected to the stator housing via one or more undercuts in order to secure the stator in the axial direction.

Expressed alternatively, the one or more undercuts can be configured to fix the stator in the axial direction. In order to be able to fix the stator in the axial direction, the undercuts have to comprise corresponding wall portions which are at least partially inclined relative to the axial direction in order thereby to absorb axial forces.

In refinements of the stator arrangement, at least one of the one or more undercuts can be formed in the circumferential portion.

In refinements of the stator arrangement, the stator housing can comprise an axial end wall. The axial end wall can extend away from the circumferential portion in the radial direction. The encapsulation body can extend in the axial direction from the stator to the axial end wall. In refinements, the axial end wall can extend from the circumferential portion outward in the radial direction (in particular in a radial flux motor having an external rotor). Alternatively, in particular in the case of a radial flux motor having an internal rotor, the axial end wall can extend from the circumferential portion radially inward in the radial direction.

In refinements, the circumferential portion can have a first (rear) axial end. At the first axial end, the axial end wall can extend away from the circumferential portion in the radial direction. A second axial (front) end lying axially opposite the first axial end can be free-standing, and therefore the stator can be pushed over said second axial end onto the circumferential portion and accommodated.

In refinements of the stator arrangement, at least one of the one or more undercuts can be formed in the axial end wall and/or in the circumferential portion. In particular, at least one undercut can be arranged in the corner region between the axial end wall and the circumferential portion. Expressed in other words, at least one undercut can be at least partially arranged in both the axial end wall and the circumferential portion.

In refinements of the stator arrangement, the axial end wall can be substantially annular.

In refinements of the stator arrangement, the circumferential portion can be a first circumferential portion. The stator housing can furthermore comprise a second circumferential portion. The second circumferential portion can be arranged spaced apart from the first circumferential portion in the radial direction. The encapsulation body can extend in the radial direction from the first circumferential portion to the second circumferential portion. In particular, the second circumferential portion can be arranged spaced apart outward in the radial direction from the first circumferential portion (in particular in a radial flux motor having an external rotor). Alternatively, in particular in the case of a radial flux motor having an internal rotor, the second circumferential portion can be arranged spaced apart inward in the radial direction from the first circumferential portion.

In refinements of the stator arrangement, at least one of the one or more undercuts can be formed in the second circumferential portion. In refinements of the stator arrangement, at least one of the one or more undercuts can be arranged in the second circumferential portion and/or in the axial end wall. In particular, at least one undercut can also be arranged in the corner region between the axial end wall and the second circumferential portion. Expressed in other words, at least one undercut can be at least partially arranged in both the axial end wall and the second circumferential portion.

In refinements of the stator arrangement, the first circumferential portion and/or the second circumferential portion can extend away from the axial end wall in the axial direction. In particular, the first circumferential portion can extend axially away from a radially inner end of the axial end wall (in particular in a radial flux motor with an external rotor). In particular, the second circumferential portion can extend axially away from a radially outer end of the axial end wall (in particular in a radial flux motor with an external rotor). Vice versa, in an internal rotor, the first circumferential portion would extend away axially from a radially outer end of the axial end wall and the second circumferential portion from a radially inner end of the axial end wall.

In refinements of the stator arrangement, at least one of the one or more undercuts can be formed by a surface, which is inclined with respect to the axis of rotation, in the first circumferential portion and/or the second circumferential portion.

In refinements of the stator arrangement, at least one of the one or more undercuts can be formed by a depression in the stator housing, in which depression the encapsulation body engages. In particular, a plurality of depressions can be provided which are spaced apart radially and/or axially and/or in the circumferential direction and form corresponding multiple undercuts. In particular, the depression can have rounded (not sharp-edged) delimitations and/or edges and/or corners. By this means, flow into it during the encapsulation can be improved. In addition, the risk of tension cracks can thereby be reduced. In refinements of the stator arrangement, the depression or the undercut can be groove-shaped. In refinements of the stator arrangement, the depression or the undercut can extend substantially annularly in the circumferential direction in the stator housing. In particular, annular may also include in the shape of an annular portion. Expressed in other words, this can be understood as meaning an intermittent groove. In refinements, the depression or the undercut can extend over a range of approximately 5° to approximately 360°.

In refinements of the stator arrangement, the stator can be arranged at least partially in contact in the radial direction with the circumferential portion. In particular, the stator can lie with an inner circumferential surface on a radially outer surface of the (first) circumferential portion (in particular in a radial flux motor with an external rotor). Alternatively, in particular in the case of a radial flux motor with an internal rotor, the stator can lie at least partially in contact in the radial direction by means of an outer circumferential surface on a radially inner surface of the circumferential portion.

In refinements of the stator arrangement, the circumferential portion can comprise at least one web. The stator can be arranged in the radical direction so as to be at least partially in contact with the at least one web. Expressed in other words, the at least one web forms a radially outer surface of the circumferential portion, on which the stator lies. At least one of the at least one web can be formed in the circumferential portion of the stator housing. Alternatively or additionally, at least one, a plurality or all of the webs of the at least one web can be arranged or fastened as separate elements on the circumferential portion. For example, the webs can be formed by sleeves, in particular plastic sleeves (e.g. PTFE sleeves) which are pushed onto the circumferential portion. In summary, the circumferential portion can comprise at least one web which is defined by the circumferential portion or by a separate element.

In refinements of the stator arrangement, the at least one web can extend in the circumferential direction. In particular, the at least one web can extend completely, in sections or intermittently in the circumferential direction. In sections or intermittently should be understood in such a manner that the web, by means of one or more web portions which are interrupted in the circumferential direction, forms an annular or cylindrical supporting surface for the stator, which supporting surface can serve in particular for centering the stator.

In refinements of the stator arrangement, the circumferential portion can comprise two axially spaced-apart webs for receiving the stator. In particular, the stator can rest with two axially opposite end regions of the stator laminated core on the webs.

In refinements, the webs can have different outer circumferences. In refinements, the front web can have a smaller outer circumference or outer diameter than the rear web. For example, an outer diameter of the front web can be 0.1 mm to 2 mm, preferably 0.2 mm to 1.5 mm, and particularly preferably 0.5 mm to 1 mm smaller than the rear web. By this means, on the one hand, better mountability of the stator, in particular the stator laminated core, on the circumferential portion can be ensured and, on the other hand, so too can a firm fit and good centering. In particular, the stacking of the stator laminations to form a stator laminated core mean that minimal radial displacements of individual laminations can arise, as a result of which the inner diameter of the entire stator laminated core is not uniform. By means of a front web having a smaller diameter, tolerances, in particular during the installation, can more easily be compensated for. The rear web can remain here in accordance with the desired fit, for example press fit. Simple installation and a firm fit of the stator are therefore achieved at the same time. While the refinements having different diameters afford certain advantageous technical effects, it goes without saying that, in alternative refinements, the webs can also have an identical outer radius or diameter.

In some refinements, it is also possible to provide more than two axially spaced-apart webs.

In refinements having at least two webs, at least one web can extend in the axial direction over a maximum of 25%, preferably a maximum of 15%, and particularly preferably over a maximum of 5% of an entire axial width of a stator laminated core of the stator. By this means, in comparison to an axially broader web, the advantage arises that the mountability and/or the fit of the stator is improved because of, for example, manufacturing/installation tolerances of the stator laminated core. This is also advantageous in particular if both webs in refinements having two webs extend over a maximum of 25%, preferably a maximum of 15%, and particularly preferably over a maximum of 5% of an entire axial width of a stator laminated core of the stator.

In refinements of the stator arrangement, a depression into which the encapsulation body projects and forms an undercut can be formed between the two webs. In addition to the axial securing by the undercut, the depression which is filled with the material of the encapsulation body leads in a synergetically advantageous manner to an improvement in the heat dissipation from the stator into the circumferential portion. In more pronounced terms, better thermal connection can be achieved in comparison to a design without a depression or without solid material therein. In refinements, the encapsulation body can substantially completely fill the depression. In particular, the formation of bubbles in the encapsulation body or during the encapsulation can be prevented or at least reduced by the formation of the depression and/or by the provision of the webs. In exemplary refinements, the depression can have a radial depth in comparison to the webs of, for example, 0.01 mm to 1.0 mm, preferably of 0.05 mm to 0.5 mm, and particularly preferably of 0.1 mm to 0.25 mm. In refinements having different web diameters, the radial depth can be measured in particular relative to the web having the smaller diameter. Alternatively or additionally, at least one of the webs can have a radial height in comparison to the depression next to the corresponding web of, for example, 0.01 mm to 1.0 mm, preferably of 0.05 mm to 0.5 mm, and particularly preferably of 0.1 mm to 0.25 mm. As already mentioned, one or more further webs can also be arranged in the depression. Expressed alternatively, this means that the depression can be formed by a plurality of partial depressions between respectively adjacent webs.

In refinements, the depression can extend annularly in the circumferential direction.

In refinements, the depression can extend in the axial direction over at least 25%, preferably over at least 50%, and particularly preferably over at least 75% of an entire axial width of a stator laminated core of the stator. Analogously, in the case of more than two webs, i.e. in refinements having a depression which comprises a plurality of axially extending partial depressions, it is advantageous if the partial depressions together extend over at least 25%, preferably over at least 50%, and particularly preferably over at least 75% of an entire axial width of a stator laminated core of the stator. These features can result in a further improvement in the connection between the stator and stator housing in a thermal and structural respect. A wide depression is particularly advantageous with two narrow webs.

In refinements of the stator arrangement, the stator can be arranged in contact in the axial direction with a radially protruding offset of the circumferential portion. In particular, the offset can protrude outward in the radial direction from the circumferential portion (in particular in a radial flux motor having an external rotor). Alternatively, in particular in the case of a radial flux motor having an internal rotor, the offset can protrude inward in the radial direction from the circumferential portion.

In particular, the offset can serve as an axial stop for the stator, in particular for the stator laminated core thereof. Expressed in other words, the offset is in the form of a step. Together with the at least one web, a positionally precise placing of the stator can be ensured. This positioning can be fixed by the encapsulation body. In particular, the stator laminated core of the stator can lie axially on the offset.

In refinements, the axial stop can be arranged axially between the at least one web and the axial end wall. In particular, a radial depression in the first circumferential portion can be arranged axially between the axial stop and the axial end wall.

In refinements of the stator arrangement, the offset can at least partially extend in the circumferential direction. In refinements, the offset can extend completely in the circumferential direction. In exemplary refinements, the offset can extend approximately 5° to approximately 360° in the circumferential direction. In refinements, the offset can also be formed intermittently, for example. For example, an offset extending for 15° can be arranged every 30° in the circumferential portion.

In refinements, the stator arrangement can furthermore comprise a rotation lock. In refinements, the rotation lock can be formed by engagement of the stator and/or of the encapsulation body in the stator housing. In refinements, the rotation lock can be formed by at least one groove which extends in the axial direction in the circumferential portion and in which the stator and/or the encapsulation body engages. In refinements, the groove can be introduced, for example, radially inwardly into an outer circumferential surface of the circumferential portion. Alternatively, the groove can also be introduced radially outward into an inner circumferential surface of the second circumferential portion. In particular, the stator laminated core can engage in the groove. For this purpose, the stator laminated core can comprise a corresponding elevation on the inner diameter or on the outer diameter, the elevation projecting into the groove.

In refinements of the stator arrangement, the stator can comprise an annular stator laminated core. The stator laminated core can comprise a plurality of stator teeth and a plurality of electric windings which are in each case wound around the stator teeth.

In refinements, the stator can furthermore comprise a casing which is arranged between the stator laminated core and the electric windings. In refinements, the casing can comprise a first axial end cap and a second axial end cap. The end caps can be arranged at opposite axial ends of the stator laminated core. In particular, the end caps can be annular. In particular, the end caps can be electrically insulating.

In refinements, the stator arrangement can furthermore comprise an interconnecting disc. The interconnecting disc can be designed for guiding the electric windings away from the stator. In refinements, the interconnecting disc can be arranged axially between the stator and the axial end wall. In particular, the interconnecting disc can be embedded in the encapsulation body. The interconnecting disc makes it possible to realize a space-saving integration and insulation of the connection on the side of the stator in the direction of the inverter space. Even if the interconnecting disc is an advantageous refinement, alternative different solutions are also conceivable, for example a printed circuit board (PCB) or a Lead Frame.

In refinements, the encapsulation body can comprise a resin material. In particular, the encapsulation body can comprise a synthetic resin material. In refinements, the encapsulation body can comprise particles promoting heat conduction. In particular, the particles promoting heat conduction can be produced from a non-metallic material. As a result, an impairment of the electric and/or magnetic insulation effect of the encapsulation body can be prevented or at least reduced. For example, the encapsulation body can comprise glass fibers.

The present invention furthermore relates to a radial flux motor for a fan, wherein the radial flux motor comprises a stator arrangement in accordance with any of the preceding refinements. In addition, the radial flux motor comprises a motor housing, a rotor and a shaft, which is mounted rotationally in the motor housing. The rotor is arranged for conjoint rotation on the shaft in the motor housing. The stator of the stator arrangement is arranged radially adjacent to the rotor in the motor housing.

In refinements of the radial flux motor, the rotor can be formed externally. Furthermore, the rotor can comprise a plurality of permanent magnets. The plurality of permanent magnets can be arranged distributed in the circumferential direction on a rotor body of the rotor. The rotor body of the rotor can be in particular pot-shaped.

In refinements of the radial flux motor, the motor housing can comprise a rotor housing and the stator housing. The rotor housing and the stator housing can be interconnected with a force fit.

The present invention furthermore relates to a high-voltage fan. The high-voltage fan comprises a radial flux motor in accordance with any of the preceding refinements. In addition, the high-voltage fan comprises a fan impeller. The fan impeller is arranged for conjoint rotation on the shaft outside the motor housing.

The present invention furthermore relates to a cooling system for a fuel cell drive or a battery-electric drive. The cooling system comprises a cooling circuit, a heat exchanger, and a high-voltage fan in accordance with the preceding refinement. The high-voltage fan is designed and arranged to extract heat from the cooling circuit via the heat exchanger. In particular, the cooling system can be designed for use in a fuel cell, a battery and/or in an electric traction motor.

The present invention furthermore relates to a method for producing a stator arrangement for a radial flux motor. The method comprises the following steps. Providing a stator housing of a motor housing of the radial flux motor, the stator housing defining a circumferential portion for receiving the stator. Providing a stator. Pushing the stator onto the circumferential portion and placing a bell-shaped encapsulation thereon such that the stator is completely surrounded by the bell-shaped encapsulation and the stator housing. Encapsulating the stator in a horizontal position by filling encapsulation compound between the stator and the stator housing and/or the bell-shaped encapsulation. In the process, by curing of the encapsulation compound, an encapsulation body is provided which is form-fittingly connected to the stator housing in such a manner that the stator is secured at least in the axial direction in the stator housing by the encapsulation body. A horizontal position can be understood here as meaning an orientation of the stator arrangement in which the axial direction is opposed to the weight force. Expressed in other words, the weight force in the horizontal position points in the axial direction with respect to the end wall.

In refinements of the method, the stator can be wound with electric windings before being pushed onto the circumferential portion and can be pushed thereon as a wound stator.

In refinements of the method, the wound stator can be potted with the encapsulation compound and thereby fixed in the encapsulation body after curing of the encapsulation compound.

In refinements of the method, the encapsulation compound can be cast into one or more depressions which are recessed in the stator housing, in order, after the curing of the encapsulation compound, to produce the form-fitting connection to the stator receiving portion.

In refinements of the method, a resin material can be used as the encapsulation compound. In particular, a synthetic resin material can be used as the encapsulation compound. The resin material or the synthetic resin material can optionally be provided with fillers promoting heat conduction.

BRIEF DESCRIPTION OF THE FIGURES

Further features can be seen from the accompanying drawings, which form part of this disclosure. The drawings are intended to further explain the present disclosure and to enable a person skilled in the art to put the present disclosure into practice. However, the drawings are to be understood as non-limiting examples. Common reference signs in various figures indicate identical or similar features.

DETAILED DESCRIPTION

Figure 1:
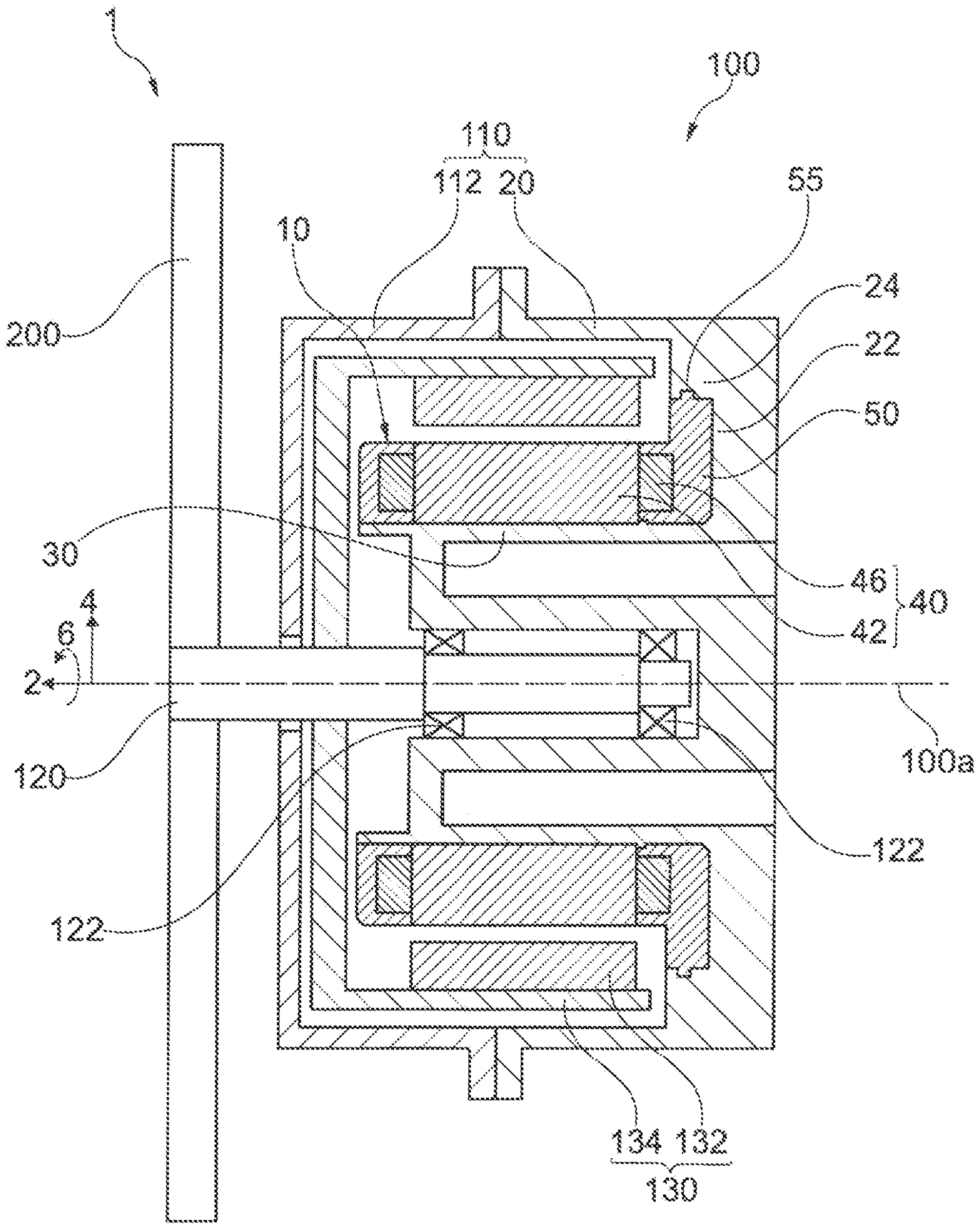
FIG. 1 shows a schematic sectional illustration of the radial flux motor having the stator arrangement.

Refinements of the stator arrangement, the radial flux motor, the high-voltage fan, the cooling system, and the method according to the present disclosure are explained below with reference to the drawings.

In the context of this application, the terms axial or axial direction relate to an axis of rotation 100*a* of the radial flux motor 100 or to a central axis 100*a* of the stator arrangement 10 and the stator 40, said central axes being arranged concentrically with respect to the axis of rotation 100*a*. Since the respective axes 100*a* of the stator 40, the stator arrangement 10, and the radial flux motor 100 are identical, they are depicted by the same reference sign. Depending on to which element or to which entity reference is being made, the (central) axis 100*a* or the axis of rotation 100*a* may be described in conjunction with the stator 40, the stator arrangement 10, and/or the radial flux motor 100 and/or further elements or entities, for example the rotor 130, the shaft 120, or the fan 1. In the figures (see, e.g. FIGS. 1, 2*a*, 3, 4 and 5), the axial direction 2 of the stator 40 and of the stator arrangement 10 of the radial flux motor 100 is depicted by the reference sign 2. The expression radial or radial direction is to be understood in relation to the axis/axial direction 2 of the stator 40 (and of the stator arrangement 10 of the radial flux motor 100) and is depicted by the reference sign 4. Similarly, a circumference, circumferentially or a circumferential direction refers to the axis 100*a*/axial direction 2 of the stator 40 and is identified by the reference sign 6. It should be understood that, although only a single exemplary direction is shown in each of the respective figures, the respective opposite direction also falls under the respective expression. Thus, for example, in FIG. 3, the circumferential direction 6 is represented by an arrow oriented counterclockwise. However, a clockwise direction about the axis 2 can also be referred to as a circumferential direction 6. This also applies analogously to the axial direction 2 and the radial direction(s) 4.

FIG. 1 shows an exemplary high-voltage fan 1 according to the present invention in a schematically simplified illustration. The high-voltage fan 1 comprises a radial flux motor 100 and a fan impeller 200. The fan impeller 200 can be driven by the radial flux motor 100. For this purpose, the fan impeller 200 is arranged for conjoint rotation on the shaft 120. As can be seen from FIG. 1, the fan impeller 200 is arranged outside a motor housing 110 of the radial flux motor 100.

In the illustration of FIG. 1, only the high-voltage fan 1 is shown for the sake of illustration. Nevertheless, the present disclosure furthermore relates to a cooling system for a fuel cell drive or a battery-electric drive. The cooling system comprises a cooling circuit, a heat exchanger, and the high-voltage fan 1. The high-voltage fan 1 is designed and arranged to extract heat from the cooling circuit via the heat exchanger. In particular, the cooling system can be designed for use in a fuel cell, a battery and/or in an electric traction motor.

With further reference to FIG. 1, the radial flux motor 100 for the high-voltage fan 1 can be seen in a schematic illustration. FIG. 1 shows the radial flux motor 100 in a schematically simplified sectional illustration along a sectional plane which is defined by the axial direction 2 and the radial direction 4. As shown, the radial flux motor 100 comprises a motor housing 110, a stator 40, a rotor 130, and a shaft 120. The shaft 120 is mounted rotationally in the motor housing 110. In this regard, the radial flux motor 100 comprises bearings 122, the arrangement of which in the motor housing 110 is shown in highly simplified form in FIG. 1. A person skilled in the art knows that the bearings 122 are secured via corresponding securing elements, for example securing rings and/or offsets, in the motor housing 110. The rotor 130 is arranged for conjoint rotation on the shaft 120 in the motor housing 110. The rotor 130 can therefore rotate together with the shaft 120 about the axis of rotation 100*a*. The stator 40 is arranged radially adjacent to the rotor 130 in the motor housing 110. In particular, the stator 40 and the rotor 130 are separated by a radial gap. The stator 40 can comprise an annular stator laminated core 42 (see FIGS. 1, 4 and 5). As can best be seen in FIG. 5, the stator laminated core 42 can comprise a plurality of stator teeth and a plurality of electric windings 46 which are in each case wound around the stator teeth. As shown in FIG. 1, the rotor 130 can comprise a rotor body 134 and a plurality of permanent magnets 132. In particular, the rotor body 134 can be fastened for conjoint rotation on the shaft 120. The plurality of permanent magnets 132 can be arranged distributed in the circumferential direction 6 on a rotor body 134 of the rotor 130. In particular, the permanent magnets 132 can be magnetized in the radial direction 4. By application of current to the electric windings 46, a magnetic flux can be generated in the radial direction 4 during operation, the flux inducing a force in the permanent magnets 132 which drive the rotor 130 (and therefore the shaft 120).

The refinements of the radial flux motor 100 that are shown in all of the figures relate to a radial flux motor 100 having an external rotor 130. As described above in the section regarding the background of the invention, the rotor 130 is arranged radially outside the stator 40 or surrounds the stator 40 radially on the outside. As can be readily seen in particular in FIGS. 4 and 5, the stator teeth protrude outward in the radial direction 4. As can be seen in FIG. 1, the rotor body 134 of the rotor 130 can in particular be pot-shaped. The permanent magnets 132 can be arranged on an inner circumference of the rotor body 134, in particular can be arranged distributed in the circumferential direction 6. Alternatively to the radial flux motor 100 which is described and shown here and has an external rotor 130, the present invention also comprises a radial flux motor having an internal rotor.

With further reference to FIG. 1, the motor housing 110 can comprise a rotor housing 112 and a stator housing 20. The rotor housing 112 and the stator housing 20 can be interconnected in particular with a force fit. In this regard, indicated in FIG. 1, respective flanges can be seen on the rotor housing 112 and the stator housing 20, via which flanges a force-fitting connection (e.g. via one or more screw connections, not depicted) of the two housings 112, 20 can be produced.

The stator 40 and the stator arrangement 10 surrounding the latter will be discussed in greater detail below. In conjunction with further elements of the radial flux motor 100, the stator arrangement 10 for the radial flux motor 100 is depicted in the right part of FIG. 1. In addition to the stator 40, the stator arrangement 10 comprises the stator housing 20 and an encapsulation body 50 (see in particular FIG. 1).

The stator housing 20 defines a circumferential portion 30 for receiving the stator 40. The circumferential portion 30 should be understood as meaning a housing portion or housing region of the stator housing 20. The stator 40 is arranged on the circumferential portion 30. In more precise terms, the stator 40 is arranged on the circumferential portion 30. As shown in the figures, the circumferential portion 30 is formed substantially cylindrically, in particular substantially circular-cylindrically. For this reason, the circumferential portion is also referred to below as the cylindrical circumferential portion 30. This should also be understood as meaning cylindrical housing portions which comprise one or more flattened portions and/or depressions and/or recesses on the outer circumference and/or on the inner circumference. According to the present disclosure, flattened portions and/or depressions and/or recesses of this type can be filled with compound of the encapsulation body 50. For example, the circumferential portion 30 can have a circular-cylindrical shape at least in one or more portions, in order to define the supporting surface for the stator 40. Expressed in other words, the stator 40 surrounds the cylindrical circumferential portion 30. In addition, the stator 40 is encapsulated in the stator housing 20. The encapsulation body 50 is form-fittingly connected to the stator housing 20 in such a manner that the stator 40 is secured at least in the axial direction 2 in the stator housing 20 by the encapsulation body 50. By fastening the stator 40 by means of the encapsulation body 50, the stator holding force can be cost-efficiently improved. In addition, greater efficiency in comparison to a screwed solution can be achieved because of smaller power losses in the stator core. In particular in comparison to alternative, in particular mechanical, fastening solutions, such as the use of a snap ring, screws with segments for clamping purposes or in the form of a complete ring instead of individual segments, the required number of parts can be reduced and the production process simplified. For example in comparison to a screwed solution, apart from inserting and encapsulating the stator 40, no additional production and installation steps are required. The encapsulation body 50 is formed by encapsulating the stator 40 in the stator housing 20. In particular, the stator 40 is fixed in the encapsulation body 50, in particular with a form fit and/or frictional lock. In particular, the stator 40 is at least partially embedded radially 4, axially 2 and/or in the circumferential direction 6 in the encapsulation body 50 in such a manner that the stator 40 is secured radially 4, axially 2 and/or in the circumferential direction 6 in the encapsulation body 50 (see FIGS. 1 and 5). In addition, the diversity of designs required for the stator housing 20 can be reduced. For example, a single stator housing design may be sufficient for different power variants.

Figure 2A:
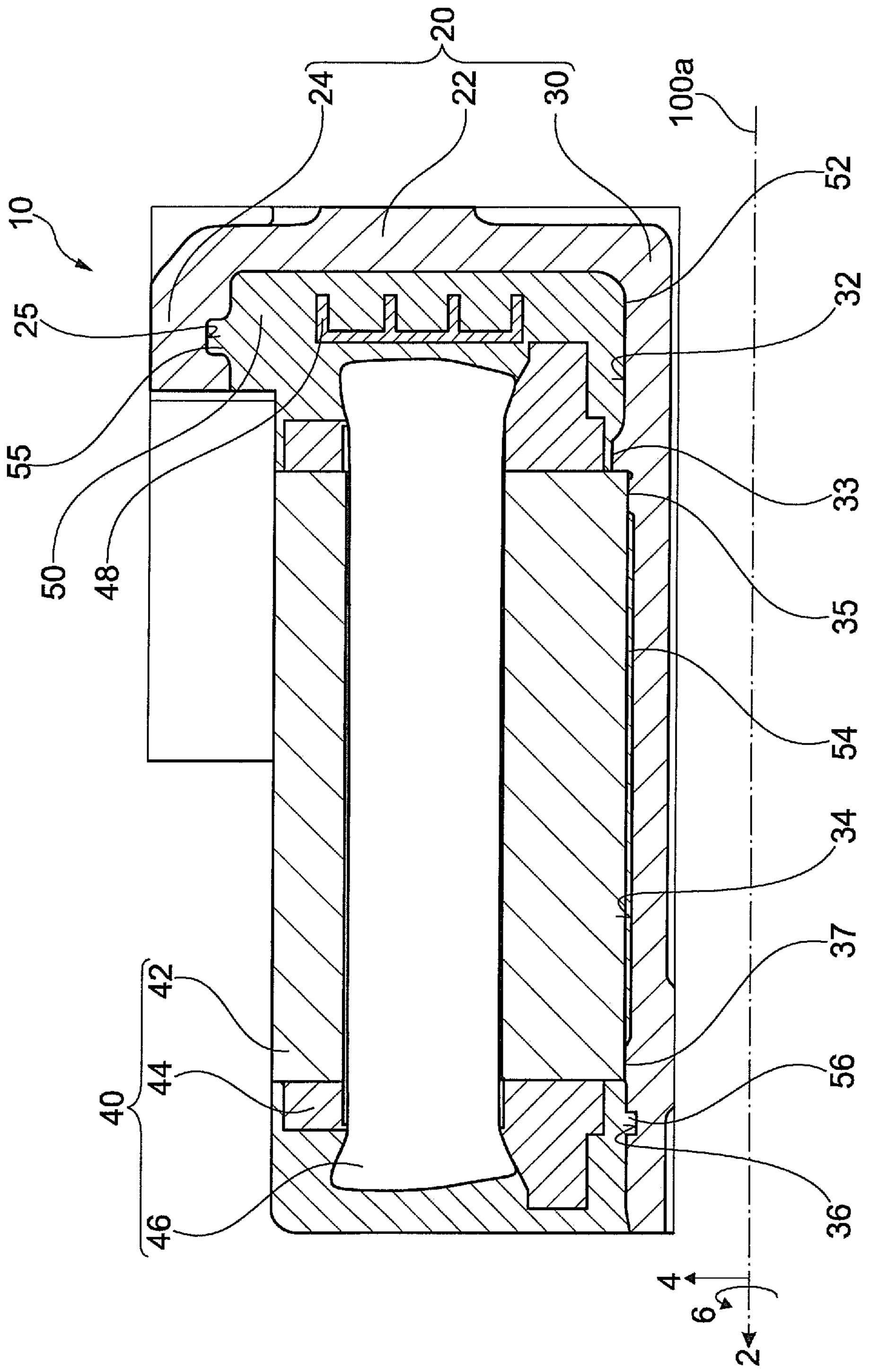
FIG. 2*a* shows a segment of the radial flux motor having the stator arrangement, in detail.

As can be seen in particular in FIGS. 1 and 2*a*, the encapsulation body 50 can be form-fittingly connected to the stator housing 20 via at least one undercut 55. The stator 40 can thereby be secured in the axial direction 2. Expressed alternatively, the at least one undercut 55 can be configured to fix the stator 40 in the axial direction 2. In order to be able to fix the stator 40 in the axial direction 2, the one or more undercuts 52, 53, 54, 55, 56 have to comprise corresponding wall portions which are at least partially inclined relative to the axial direction 2 in order thereby to absorb axial forces.

Figure 2B:
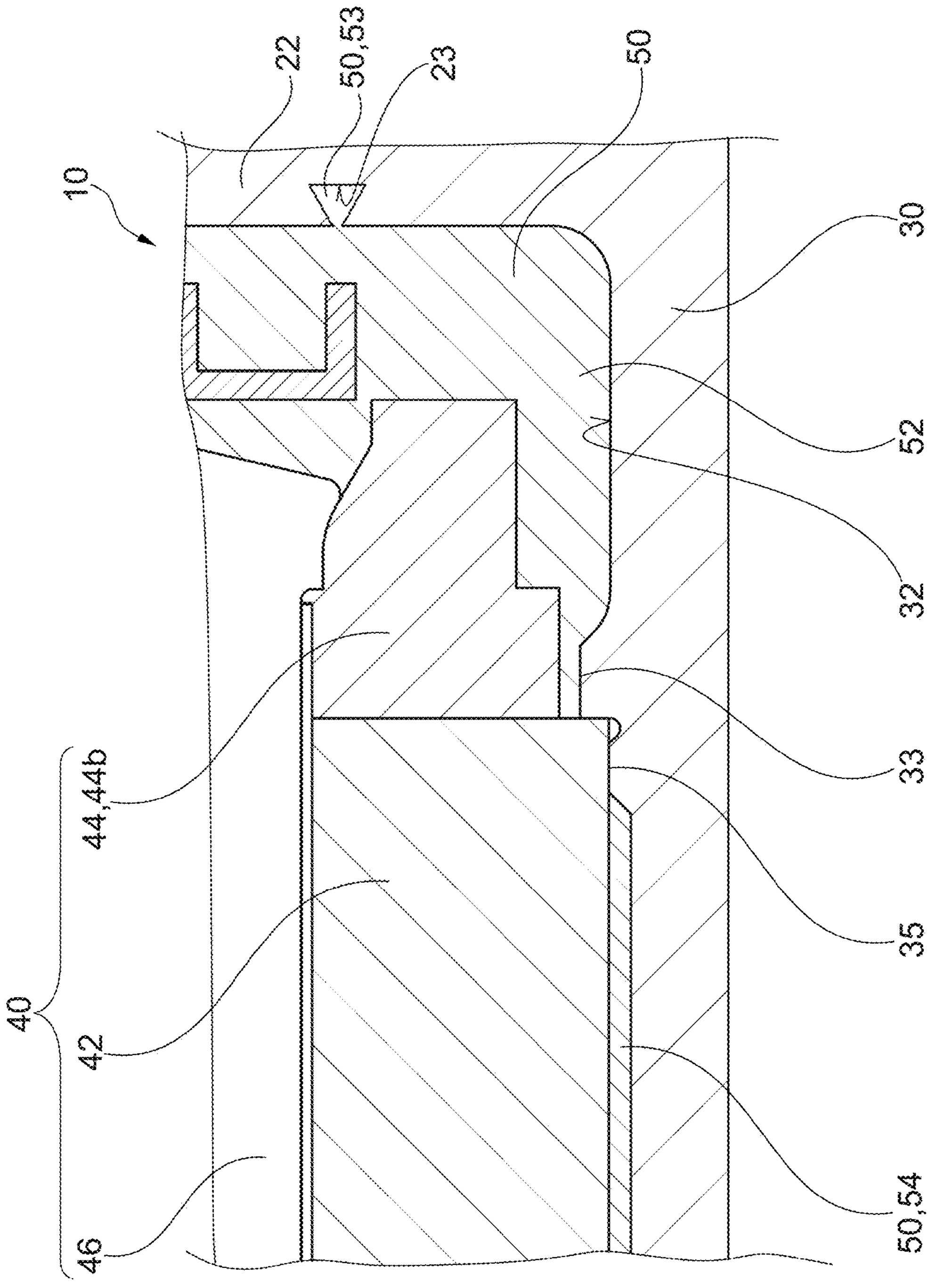
FIG. 2*b* shows a detail segment of the stator arrangement from FIG. 2*a* with an additional undercut in the axial end wall.

FIGS. 2*a* and 2*b* show respective detail segments of the upper part of the stator arrangement 10 from FIG. 1, wherein FIG. 2*b* additionally shows a further exemplary undercut 53 which is arranged in the axial end wall 22.

As in the exemplary refinements of FIGS. 1, 2*a*, 2*b*, 3, 4 and 5, the stator housing comprises an axial end wall 22 in addition to the cylindrical circumferential portion 30. The cylindrical circumferential portion 30 may also be referred to as the first cylindrical circumferential portion 30 (also called first circumferential portion 30). In addition, the stator housing 20 can furthermore comprise a second cylindrical circumferential portion 24 (also called second circumferential portion 24).

Figure 3:
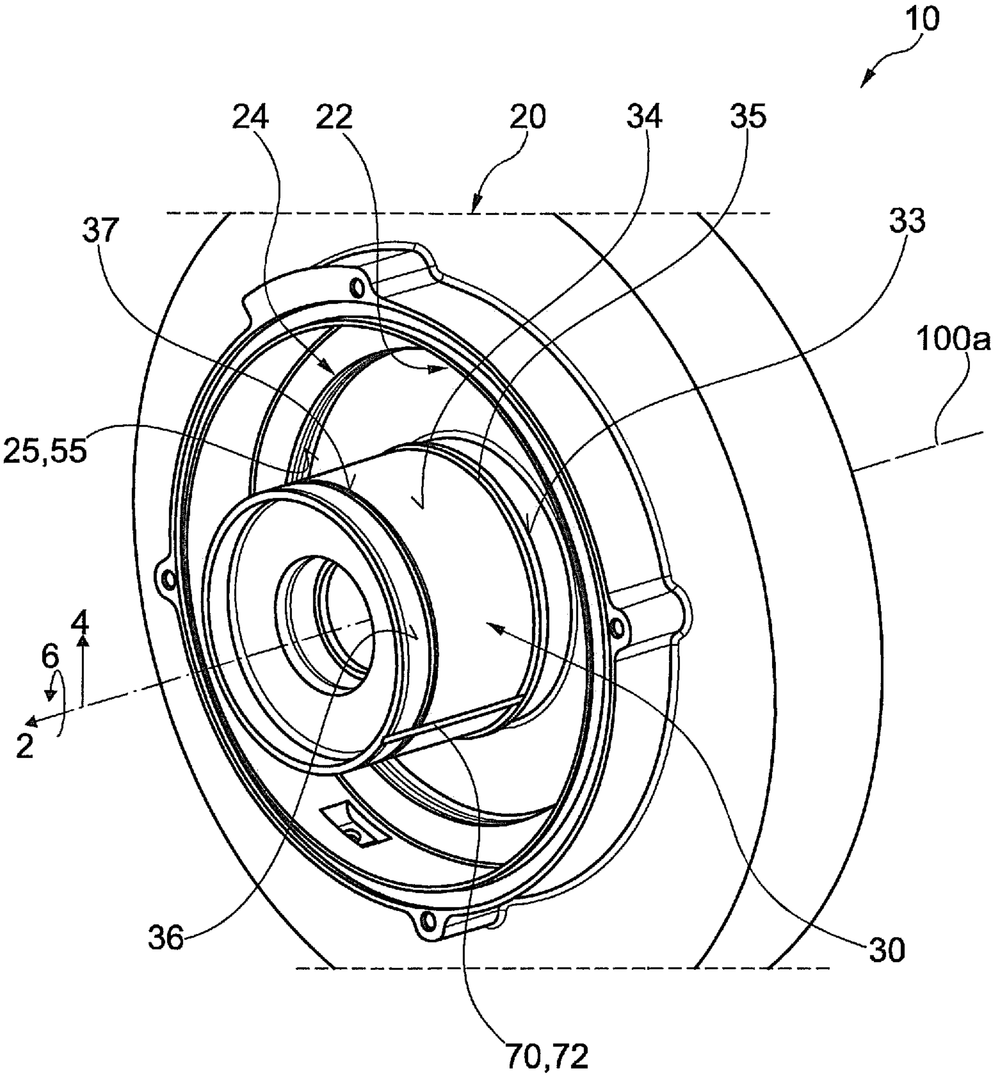
FIG. 3 shows a perspective illustration of the stator housing without an inserted stator and without an encapsulation body.
Figure 4:
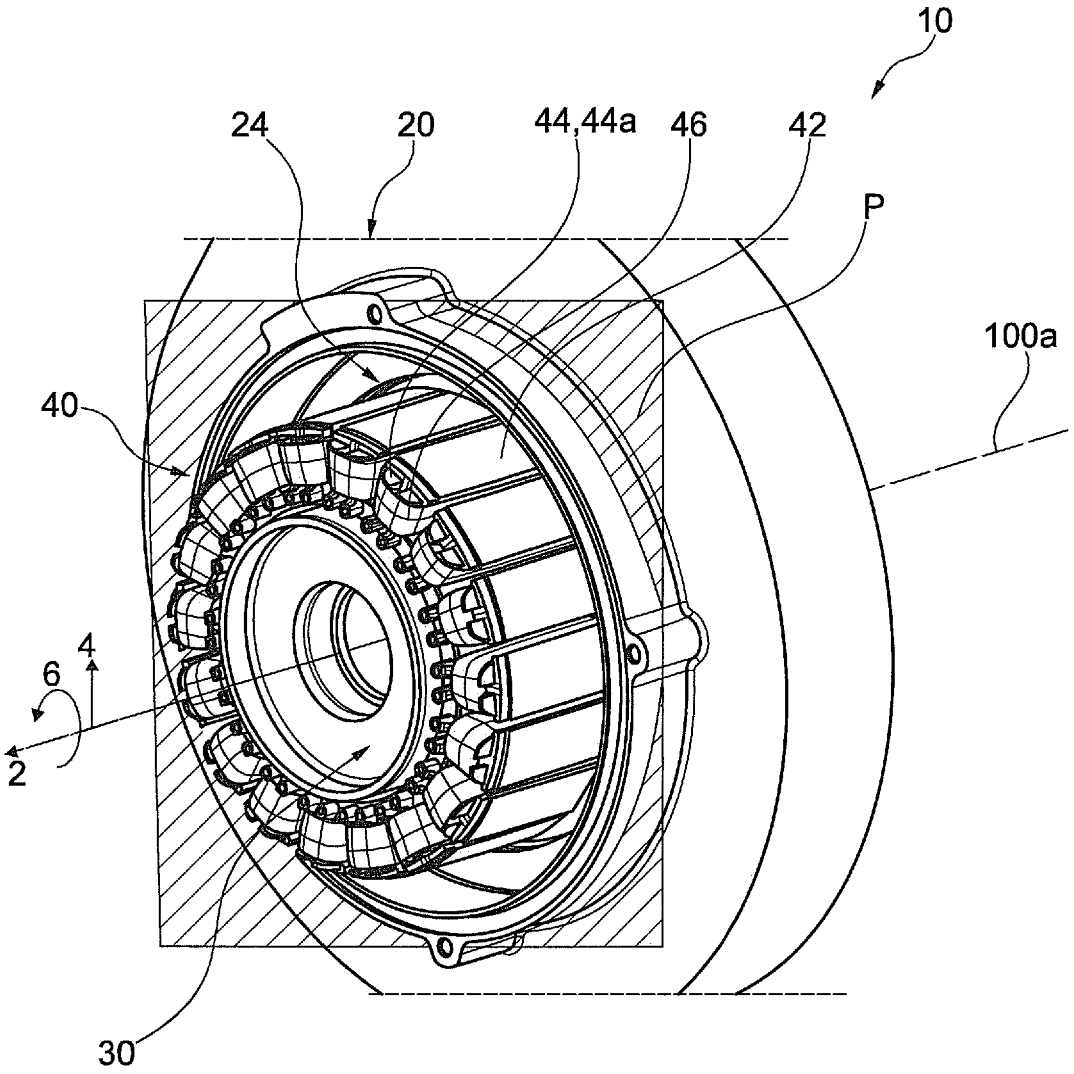
FIG. 4 shows the perspective illustration from FIG. 3 with an inserted stator (without an encapsulation body)
Figure 5:
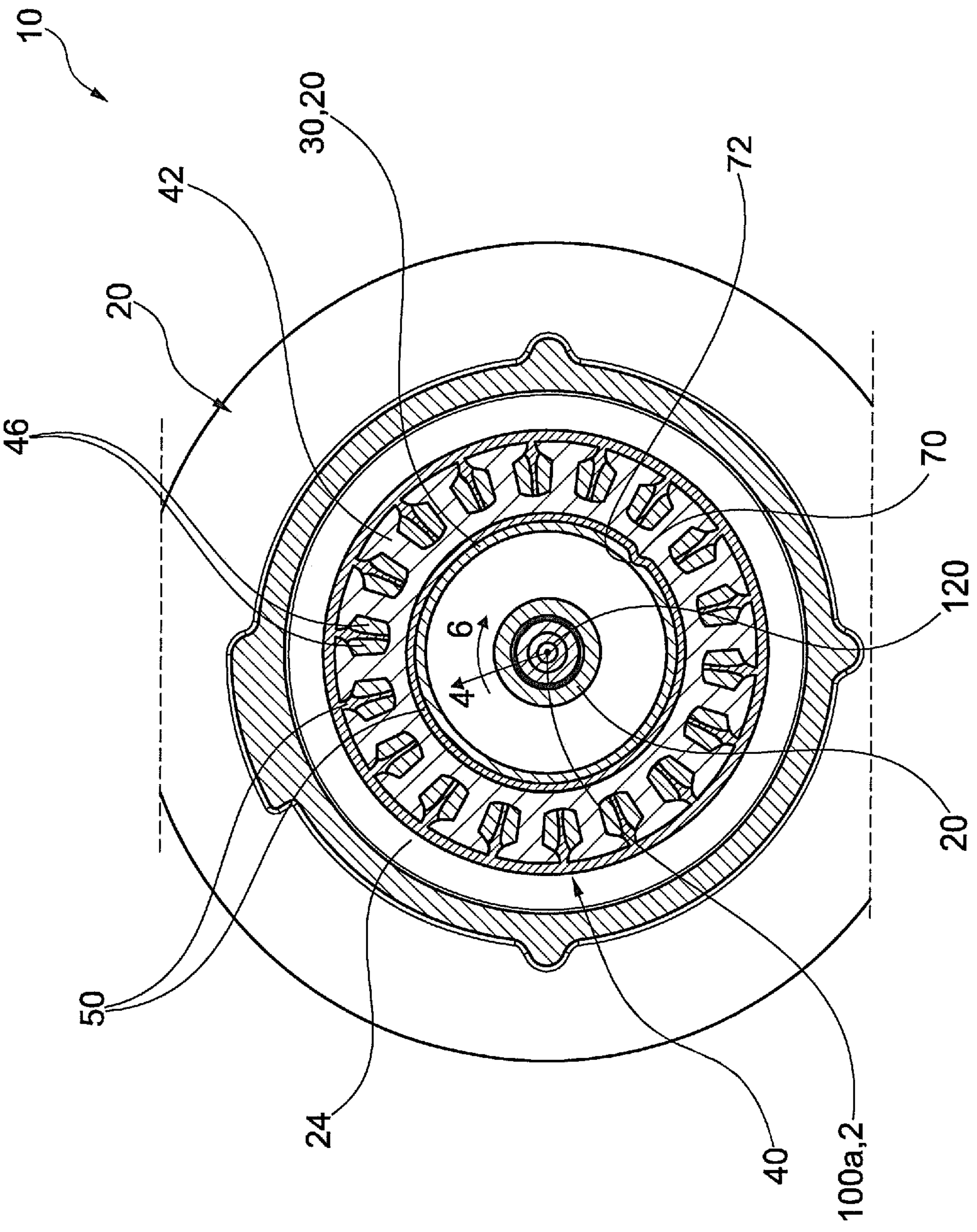
FIG. 5 shows a sectional illustration along the sectional plane P from FIG. 4, with the encapsulation body additionally being illustrated in FIG. 5.

The (first) cylindrical circumferential portion 30 can have a first (rear) axial end. At the first axial end, the axial end wall 22 can extend away from the cylindrical circumferential portion 30 in the radial direction 2 (in particular radially outward). Furthermore, the (first) cylindrical circumferential portion 30 can have a second (front) axial end lying axially opposite the first axial end. In refinements, the second axial end can be free-standing. During the installation, the stator 40 can be pushed over the second axial end onto the cylindrical circumferential portion 30 and accommodated. In this regard, FIG. 3 shows the stator housing 20 without the stator 40 and the encapsulation body 50. The first cylindrical circumferential portion 30, inter alia, can readily be seen. The stator 40 can be pushed onto the cylindrical circumferential portion 30 in the axial direction 2 counter to the direction of the arrow 2. In this respect, FIG. 4 shows the same view of the stator housing 20 from FIG. 3, with the difference that the stator 40 is already arranged in the stator housing 20 (but still without the encapsulation body 50). For the sake of completeness, it should be mentioned at this juncture that FIG. 5 depicts the stator arrangement 10 from FIG. 4 in the sectional plane P and with the encapsulation body 50. Although the first cylindrical circumferential portion 30 in FIG. 1 is double-walled, in particular with two radially spaced-apart wall portions, the first cylindrical circumferential portion 30 can also be single-walled in alternative refinements.

As already mentioned, the axial end wall 22 can extend away from the cylindrical circumferential portion 30 in the radial direction 4. In the exemplary embodiment of a radial flux motor 100 that is illustrated in FIGS. 1, 2*a*, 2*b*, 3, 4 and 5 and has an external rotor 130, the axial end wall 22 extends outward in the radial direction 4 from the cylindrical circumferential portion 30. Alternatively, in particular in the case of a radial flux motor 100 having an internal rotor 130, the axial end wall 22 can extend radially inward from the cylindrical circumferential portion 30 in the radial direction 4. In both refinements of the radial flux motor 100 (internal and/or external rotor 40), the axial end wall 22 can extend radially between the first cylindrical circumferential portion 30 and the second cylindrical circumferential portion 24. In refinements as can readily be seen, for example, in FIG. 3, the axial end wall 22 is substantially annular.

The second cylindrical circumferential portion 24 can be arranged spaced apart in the radial direction 4 from the first cylindrical circumferential portion 30. In the exemplary embodiment of a radial flux motor 100 that is illustrated in FIGS. 1, 2*a*, 2*b*, 3, 4 and 5 and having an external rotor 130, the second cylindrical circumferential portion 24 can be arranged spaced apart outward in particular in the radial direction 4 from the first cylindrical circumferential portion 30. Alternatively, in particular in the case of a radial flux motor 100 having an internal rotor 130, the second cylindrical circumferential portion 24 can be arranged spaced apart inward in the radial direction 4 from the first cylindrical circumferential portion 30.

As can furthermore be seen in the figures (in particular FIGS. 1, 2*a*, 3 and 4), the first cylindrical circumferential portion 30 and the second cylindrical circumferential portion 24 can extend away from the axial end wall 22 in the axial direction 2. In particular, the first cylindrical circumferential portion 30 can extend away axially from a radially inner end of the axial end wall 22 (in particular in a radial flux motor having an external rotor). In particular, the second cylindrical circumferential portion 24 can extend away axially from a radially outer end of the axial end wall 22 (in particular in a radial flux motor having an external rotor). In more precise terms, the first cylindrical circumferential portion 30 and the second cylindrical circumferential portion 24 can extend away from the axial end wall 22 in the same axial direction 2. Vice versa, in a radial flux motor having an internal rotor, the first cylindrical circumferential portion could extend away from a radially outer end of the axial end wall and the second cylindrical circumferential portion from a radially inner end of the axial end wall.

As already mentioned, the stator housing 20 is connected via a flange to the rotor housing 112 via its flange. It can be seen from FIG. 1 that the stator housing 20 or the second cylindrical circumferential portion 24, in a radially outer region, comprises a further wall portion which extends radially outside the rotor 130 in the axial direction 2 toward the rotor housing 112. It should be understood that this refinement should be considered as being merely by way of example. In alternative refinements, the rotor housing 112 could also protrude axially further in the direction of the stator housing 20 and/or could surround the stator housing 20 radially. Expressed in other words, the stator housing 20 could also be formed without the above-described further wall portion in the radially outer region.

In the refinement example illustrated (see in particular FIGS. 1 and 4), the first cylindrical circumferential portion 30 forms a radially outwardly facing outer circumferential surface. Lying radially opposite, the second cylindrical circumferential portion 24 forms a radially inwardly facing inner circumferential surface. Said inner circumferential surface can directly adjoin the axial end wall 22. In more precise terms, the second cylindrical circumferential portion 24 forms an offset which projects in the axial direction 2 with respect to rotor 130. Said offset can be particularly readily seen at the top right in FIG. 2*a* at the reference number 24. In conjunction with FIG. 1, it can be seen that the offset forming the inner circumferential surface is arranged further radially on the inside relative to the rotor 130 than the rotor 130 (but spaced apart axially thereto). However, the second cylindrical circumferential portion 24 still remains spaced apart axially from the rotor 130 here. Expressed in other words, the inner circumferential surface of the second cylindrical circumferential portion 24 is arranged spaced apart axially from the rotor 130. In refinements, it would also be conceivable for the inner circumferential surface to be arranged further radially outward than depicted, for example at the same radial height as the rotor 130 or radially outside the rotor 130. For example, the inner circumferential surface could also be flush with the wall portion of the stator housing 20 (the same wall portion on which reference sign 20 is arranged in FIG. 1), which also protrudes with respect to the flange or with respect to the rotor housing 112. Analogously, the second cylindrical circumferential portion 24 or the inner circumferential surface thereof can also be arranged further radially inward, for example at the radial height of an outer circumference of the stator 20. Analogously to the above explanations regarding the first circumferential portion 30, the second circumferential portion 24 can also be non-cylindrical, for example rectangular or oval. This is because the second circumferential portion 24, as shown in the figures, is substantially cylindrical, in particular substantially circular-cylindrical. For this reason, the second circumferential portion can also be referred to as the cylindrical circumferential portion 30.

This should also be understood as meaning cylindrical housing portions which comprise one or more flattened portions and/or depressions and/or recesses on the outer circumference and/or on the inner circumference. According to the present disclosure, such flattened portions and/or depressions and/or recesses can be filled with compound of the encapsulation body 50.

At least in an axially rear region of the stator housing, the first cylindrical circumferential portion 30, the axial end wall 22 and the second cylindrical circumferential portion 24 form an annular axial depression. Expressed in other words, the three portions 22, 24, 30 of the stator housing 20 form an axial depression which extends in the circumferential direction 6. This depression can readily be seen at the position of the reference sign for the axial end wall 22 in FIG. 3. The encapsulation body 50 extends in said depression. Expressed in other words, the encapsulation body 50 (inter alia) is arranged in the depression. In particular, the encapsulation body 50 can substantially fill the depression. It should be mentioned at this juncture that, in alternative refinements, the stator arrangement 10 could also only comprise the axial end wall 22 and the first circumferential portion 30. That is to say, the above-described depression can advantageously contribute to improved holding of the stator 40 or of the encapsulation body 50, but is not absolutely required for all of the refinements of the present disclosure.

In particular with reference to FIG. 2*a*, the encapsulation body 50 can extend in the axial direction 2 from the stator 40 to the axial end wall 22. Expressed alternatively, the encapsulation body 50 can be arranged between the stator 40 and the axial end wall 22, in particular can axially fill said region. Furthermore, the encapsulation body 50 can be arranged on a side of the stator 40 lying axially opposite the end wall 22. In particular, the encapsulation body 50 can surround the stator 40 on both axial sides of the stator 40. The encapsulation body 50 can extend in the radial direction 4 from the first cylindrical circumferential portion 30 to the second cylindrical circumferential portion 24.

In refinements, the encapsulation body 50 can comprise a resin material. In particular, the encapsulation body 50 can comprise a synthetic resin material. In refinements, the encapsulation body 50 can comprise particles promoting heat conduction. In particular, the particles promoting heat conduction can be produced from a non-metallic material. As a result, an impairment of the electric and/or magnetic insulation effect of the encapsulation body 50 can be prevented or at least reduced. For example, the encapsulation body 50 can comprise glass fibers.

As already mentioned with reference to FIGS. 1 and 2*a*, the stator arrangement 10 can comprise at least one undercut 55 for axial securing purposes. The one or more undercuts 52, 53, 54, 55, 56 are formed between the encapsulation body 50 and the stator housing 20. In particular, the undercuts 52, 53, 54, 55, 56 can be formed by corresponding depressions 32, 23, 34, 25, 36 in the stator housing 20, in which depressions the encapsulation body 50 engages. Alternatively or additionally, one or more undercuts for axial holding purposes can also be formed by elevations which are formed in the stator housing 20 and engage in the encapsulation body 50 (not shown in the figures). Owing to the fact that the stator 40 is fixed in the encapsulation body 50, the stator can also be secured by the one or more undercuts 52, 53, 54, 55, 56 between the encapsulation body 50 and the stator housing 20.

In principle, one or more undercuts 52, 53, 54, 55, 56 and depressions 32, 23, 34, 25, 36 can be formed in the first cylindrical circumferential portion 30 and/or in the axial end wall 22 and/or in the second cylindrical circumferential portion 24. In principle, features which are explained with respect to a certain undercut 52, 53, 54, 55, 56 can also be used on other undercuts (shown and not shown), if technically expedient.

In FIG. 2*a*, the undercut 55 is formed by way of example in the second cylindrical circumferential portion 24. The undercut 55 is formed by a depression 25 in the second circumferential portion 24 and by the encapsulation body 50 engaging in said depression. The undercut 55 or the depression 25 is substantially rectangular in cross section (here for example in a plane which is spanned by the axial direction 2 and the radial direction 4). In alternative refinements, the undercut 55 or the depression 25 can also have a different cross-sectional shape, for example round, (partially) circular, oval, triangular or polygonal. The depression 25 is recessed outward in the radial direction 4 in the second cylindrical circumferential portion 24, in particular in the inner circumferential surface thereof. Corners and edges of the depression 25 are rounded, as a result of which the filling behavior, in particular the inflow behavior, during the encapsulation of the stator 40 in the stator housing 20 can be improved. This can in turn improve the degree of filling and/or the filling quality and therefore the properties of the encapsulation body 50. In addition, the risk of tension cracks can thereby be reduced. As can be seen in particular in FIG. 3, the depression 25 or the undercut 55 can extend annularly in the circumferential direction 6. As shown in FIG. 3, the depression 25 or the undercut 55 can extend completely around 360° or alternatively only partially in the circumferential direction 6 here. In particular, annular may also include in the shape of an annular portion. Expressed in other words, this can be understood as meaning an intermittent depression or undercut. For example, the depression 25 or the undercut 55 can also extend only in sections in one or more portions in the circumferential direction 6. In one specific example, a depression 25 or undercut 55 extending for 30° can be formed every 15° in the second cylindrical circumferential portion 24. As already mentioned, the above explanations can also be used for further depressions or undercuts. Although advantageous, the undercut 55 is not absolutely required in the second cylindrical circumferential portion 24 as long as at least one undercut is formed between the encapsulation body 50 and the stator housing 20. Alternatively, a plurality of undercuts can also be formed in the second cylindrical circumferential portion 24. The plurality of undercuts can be spaced apart circumferentially and/or axially.

Alternatively or additionally, one or more undercuts can also be formed in a corner region between the axial end wall 22 and the second cylindrical circumferential portion 24. This also applies analogously to the corner region between the axial end wall 22 and the first cylindrical circumferential portion 30. Expressed in other words, at least one undercut can be at least partially arranged in both the axial end wall 22 and the cylindrical circumferential portion (the first circumferential portion 30 or the second circumferential portion 24).

Alternatively or additionally to the depression 25, an undercut in the second cylindrical circumferential portion 24 can be formed by a surface, which is inclined with respect to the axis of rotation 100*a*, in the second cylindrical circumferential portion 24. This can be a partial surface of the inner circumferential surface of the second cylindrical circumferential portion 24 or the entire inner circumferential surface. In order to achieve axial securing, the inclined surface of the second cylindrical circumferential portion 24 has to have an angle smaller than 90° relative to the axial end wall 22 or its end surface facing the stator 40 (if said end surface extends in precisely the radial direction 4). This analogously also applies to the first cylindrical circumferential portion 30 and its outer circumferential surface which, at least in a partial surface, can have an angle of smaller than 90° relative to the axial end wall 22 (if the latter extends in exactly the radial direction).

As shown by way of example in FIG. 2*b*, an undercut 53 can be formed in the axial end wall 22. In particular, an axial depression 23 can be formed in the axial end wall 22, in which depression the encapsulation body 50 engages in order to form the undercut 53. In the example illustrated, the depression 23 or the undercut 53 is substantially triangular in order to absorb axial forces. In alternative refinements, other cross-sectional shapes, for example round, oval, trapezoidal or in the form of a parallelogram, are also conceivable as long as they comprise a surface, which is inclined with respect to the axis of rotation 100*a*, for absorbing axial forces in the axial direction 2 away from the axial end wall 22. For example, the shape of a parallelogram could be produced by an oblique incision and corresponding milling out. In particular, the depression 23 or the undercut 53 can extend partially or completely in the circumferential direction 6 analogously to the above explanation regarding the undercut 55. Also, a plurality of (e.g. two or more) radially or circumferentially spaced-apart depressions or undercuts are conceivable.

Again with reference to FIG. 2*a*, a first undercut 52, a second undercut 54 and a third undercut 56 are formed in the first cylindrical circumferential portion 30. The first undercut 52 is formed by a radial depression 32 at the first axial end of the first cylindrical circumferential portion 30, in which depression the encapsulation body 50 engages. The second undercut 54 is formed by a radial intermediate web depression 34 between the first and the second axial end of the first cylindrical circumferential portion 30, in which the encapsulation body 50 engages. The third undercut 56 is formed by a radial depression 36 at the second end of the first cylindrical circumferential portion 30 or in an end region of the second end, in which depression the encapsulation body 50 engages. In contrast to the undercut 55, the undercuts 52, 54, 56 and the associated depressions 32, 34, 36 are recessed inward in the radial direction 4. As already mentioned, the above explanations regarding the undercuts 55, 53 and the depressions 25, 23 thereof can also be applied analogously to the undercuts 52, 54, 56 and the associated depressions 32, 34, 36.

As already explained, the stator 40 can be arranged on the first cylindrical circumferential portion 30. In particular, the stator 40 can be arranged so as to be at least partially in contact in the radial direction 4 with the cylindrical circumferential portion 30. In particular, the stator 40 can lie with an inner circumferential surface on a radially outer surface of the first cylindrical circumferential portion 30 (in particular in a radial flux motor 100 having an external rotor 130). Alternatively, in particular in the case of a radial flux motor having an internal rotor, the stator 40 can lie so as to be at least partially in contact in the radial direction 4 with an outer circumferential surface on a radially inner surface of the cylindrical circumferential portion (not depicted). "At least partially in contact" should be understood as meaning that, because of manufacturing tolerances, it is not necessarily ensured that the entire circumference of the stator 40 is fully in contact with the circumferential portion 30. However, it can be understood in such a manner that the at least partially contacting arrangement is designed for the radial mounting and for the centering of the stator 40.

As can be gathered in particular from FIGS. 2*a*, 2*b* and 3, the first cylindrical circumferential portion 30 comprises a first web 35 and a second web 37. The stator 40 can be arranged so as to be at least partially in contact in the radial direction 4 with at least one out of the first web 35 and the second web 37. Expressed in other words, the first web 35 and the second web 37 each form a radially outer surface of the cylindrical circumferential portion 30, on which surface the stator 40 lies. In alternative refinements, the first cylindrical circumferential portion 30 can also comprise only one web or more than two webs. One or both of the first web 35 and the second web 37 (or the more than two webs) can be formed in the cylindrical circumferential portion 30 of the stator housing 20 (i.e. be defined by the cylindrical circumferential portion 30). Alternatively or additionally, at least one, a plurality or all of the webs can be arranged or fastened as separate elements on the circumferential portion 30. For example, the webs can be formed by sleeves pushed onto the circumferential portion 30, in particular plastic sleeves (e.g. PTEF sleeves). In summary, the first cylindrical circumferential portion 30 can comprise at least one web 35, 37 which is defined by the first cylindrical circumferential portion 30 or by a separate element.

As can be seen in particular in FIG. 4, the first web 35 and the second web 37 extend completely in the circumferential direction 6. Alternatively, at least one out of the first web 35 and the second web 37 can extend in sections or intermittently in the circumferential direction 6. In sections or intermittently should be understood as meaning that the web, by means of one or more web portions which are interrupted in the circumferential direction 6, forms an annular or cylindrical supporting surface (with interruptions) for the stator 40, which supporting surface can serve in particular for centering the stator 40. In one specific example, a web 35, 37 extending for 30° can be formed every 15° in the circumferential direction 6.

The two webs 35, 37 can be in particular spaced apart axially. The intermediate web depression 34 already mentioned above can be formed axially between the two webs 35, 37. In particular, the encapsulation body 50 can project into the depression 34 and form the undercut 54. In particular, the stator 40 can rest with two axially opposite end regions of the stator laminated core 42 on the webs 35, 37. In addition to the axial securing by means of the undercut 54, the depression 34 which is filled with the material of the encapsulation body 50 leads in a synergetically advantageous manner to an improvement in the heat dissipation from the stator 40 into the first cylindrical circumferential portion 30. In more precise terms, better thermal connection can be achieved in comparison to a design without a depression or without solid material (i.e. the encapsulation body 50). In refinements, the encapsulation body 50 can substantially completely fill the depression 34. In particular, by means of the formation of the depression 34 and/or by the provision of the webs 35, 37, the formation of bubbles in the encapsulation body 50 or during the encapsulation can be prevented or at least reduced. In exemplary refinements, the depression 34 can have a radial depth in comparison to the webs 35, 37 of, for example, 0.01 mm to 1.0 mm, preferably of 0.05 mm to 0.5 mm, and particularly preferably of 0.1 mm to 0.25 mm. In refinements having different web diameters, the radial depth can be measured in particular relative to the web 37 having the smaller diameter. In particular, the radial depth can be measured in particular relative to the front web 37. Alternatively or additionally, at least one of the webs 35, 37 can have a radial height in comparison to the depression 34 next to the corresponding web 35, 37 of, for example, 0.01 mm to 1.0 mm, preferably of 0.05 mm to 0.5 mm, and particularly preferably of 0.1 mm to 0.25 mm. As already mentioned, one or more further webs can also be arranged in the depression 34. Expressed alternatively, this means that the depression 34 can be formed by a plurality of partial depressions between respectively adjacent webs.

As can be seen in particular in FIG. 4, the depression 34 can extend annularly in the circumferential direction 4.

In particularly advantageous refinements, the first and the second web 35, 37 extend in the axial direction 2 over a maximum of 5% of an entire axial width of a stator laminated core 42 of the stator 40. This results, in comparison to an axially wider web, in the advantage that the mountability and/or the fit of the stator 40 is improved because of, for example, manufacturing/installation tolerances of the stator laminated core 42. This is also advantageous in particular if at least the first (rear) web 35, which is arranged closer to the axial end wall 22, extends at maximum over 5% of an entire axial width of a stator laminated core 42 of the stator 40. In alternative and also advantageous refinements, one or both webs 35, 37 can extend over at maximum 25% or preferably at maximum 15% of an entire axial width of a stator laminated core 42 of the stator 40.

In particularly advantageous refinements, the depression 34 can extend in the axial direction 2 over at least 25%, preferably over at least 50%, and particularly preferably over at least 75% of an entire axial width of a stator laminated core 42 of the stator 40. Analogously in the case of more than two webs, i.e. in refinements having a depression 34 which comprises a plurality of axially extending partial depressions, it is advantageous if the partial depressions extend together over at least 25%, preferably over at least 50%, and particularly preferably over at least 75% of an entire axial width of a stator laminated core 42 of the stator 40. These features can result in a further improvement of the connection (via the encapsulation body 50) between the stator 40 and stator housing 20 in a thermal and structural respect. A wide depression 34 is particularly advantageous with two narrow webs 35, 37.

In refinements, the two webs 35, 37 can have different outer circumferences. In refinements, the front web 37 can have a smaller outer circumference or outer diameter than the rear web 35. For example, an outer diameter of the front web 37 can be 0.1 mm to 2 mm, preferably 0.2 mm to 1.5 mm, and particularly preferably 0.5 mm to 1 mm smaller than the rear web 35. By this means, firstly, better mountability of the stator 40, in particular of the stator laminated core 42, on the first cylindrical circumferential portion 30 can be ensured, as can, on the other hand, a firm fit and good centering. In particular, the stacking of the stator laminations to form a stator laminated core 42 can result in minimal radial displacements of individual laminations, as a result of which the inner diameter of the entire stator laminated core 42 is not always precisely uniform. By means of a front web 37 having a smaller diameter, tolerances, in particular during the installation, can be more easily compensated for. The rear web 35 can remain here in accordance with the desired fit, for example press fit. Simple installation and a firm fit of the stator 40 are therefore achieved at the same time. While the refinement having different diameters affords certain advantageous technical effects, it is understood that, in alternative refinements, the webs 35, 37 can also have an identical outer radius or diameter.

As is shown in particular in FIG. 2*b*, the stator 40 can be arranged in contact in the axial direction 2 with a radially protruding offset 33 of the first cylindrical circumferential portion 30. In particular, the offset 33 can protrude outward in the radial direction 4 from the first cylindrical circumferential portion 30 (in particular in a radial flux motor 100 having an external rotor 130). Alternatively, in particular in the case of a radial flux motor having an internal rotor, the offset 33 can protrude inward in the radial direction from the cylindrical circumferential portion.

In particular, the offset 33 can serve as an axial stop for the stator 40, in particular for its stator laminated core 42. Expressed in other words, the offset 33 is in the form of a step. Together with the at least one web 35, 37, positionally precise placing of the stator 40 can be ensured. This positioning can be fixed by the encapsulation body 50. In particular, the stator laminated core 42 of the stator 40 can lie axially on the offset 33.

In refinements, the axial stop 33 can be arranged axially between the at least one web 35, 37 and the axial end wall 22. In particular, the first radial depression 32 in the first cylindrical circumferential portion 30 can be arranged axially between the axial stop 33 and the axial end wall.

In refinements of the stator arrangement 10, the offset 33 can at least partially extend in the circumferential direction 6. In refinements, the offset 33 can completely extend in the circumferential direction 4. In exemplary refinements, the offset 33 can extend approximately 5° to approximately 360° in the circumferential direction 6. In refinements, the offset 33 can also be intermittent, for example. For example, an offset extending for 15° can be arranged every 30° in the cylindrical circumferential portion 30.

In refinements, the stator arrangement 10 can furthermore comprise a rotation lock 70. In refinements, the rotation lock 70 can be formed by engagement of the stator 40 and/or of the encapsulation body 50 in the stator housing 20 (see in particular FIGS. 4 and 5). In refinements, the rotation lock 70 can be formed by at least one groove 72 which extends in the cylindrical circumferential portion 30 in the axial direction 2 and in which the stator 40 and/or the encapsulation body 50 engages. In refinements, the groove 72 can be introduced, for example, radially inward into an outer circumferential surface of the cylindrical circumferential portion 30. Alternatively, the groove 72 can also be introduced radially outward into an inner circumferential surface of the second cylindrical circumferential portion 24. In particular, the stator laminated core can engage in the groove 72. For this purpose, the stator laminated core 42 can comprise a corresponding elevation on the inner diameter or on the outer diameter, the elevation projecting into the groove 72 (see schematic elevation on the inner diameter of the stator laminated core 42 from FIG. 5).

In refinements, the stator 40 can furthermore comprise a casing 44 which is arranged between the stator laminated core 42 and the electric windings 46 (see in particular FIGS. 2*a* and 4). In refinements, the casing 44 can comprise a first axial end cap 44*a* and a second axial end cap 44*b*. The end caps 44*a*, 44*b* can be arranged axially next to the stator laminated core 42 at opposite axial ends of the stator laminated core 42. In particular, the end caps 44*a*, 44*b* can be annular. In particular, the end caps 44*a*, 44*b* can be electrically insulating.

In refinements, the stator arrangement 10 can furthermore comprise an interconnecting disc 48. The interconnecting disc 48 can be designed for guiding the electric windings 46 away from the stator 40. In refinements, the interconnecting disc 48 can be arranged axially between the stator 40 and the axial end wall 22. In particular, the interconnecting disc 48 can be embedded in the encapsulation body 50. Space-saving integration and insulation of the connection on the side of the stator 40 in the direction of the inverter space can be realized by the interconnecting disc 48.

The inverter space can be arranged, for example, axially next to the axial end wall 22. In refinements, for this purpose, the axial end wall 22 can have a passage (not depicted) in the axial direction 2, as seen to the right in FIG. 2*a*, to the cable bushing. Even though the interconnecting disc 48 constitutes an advantageous refinement, alternative other solutions, for example a printed circuit board (PCB) or a lead frame, are also conceivable.

Figure 6:
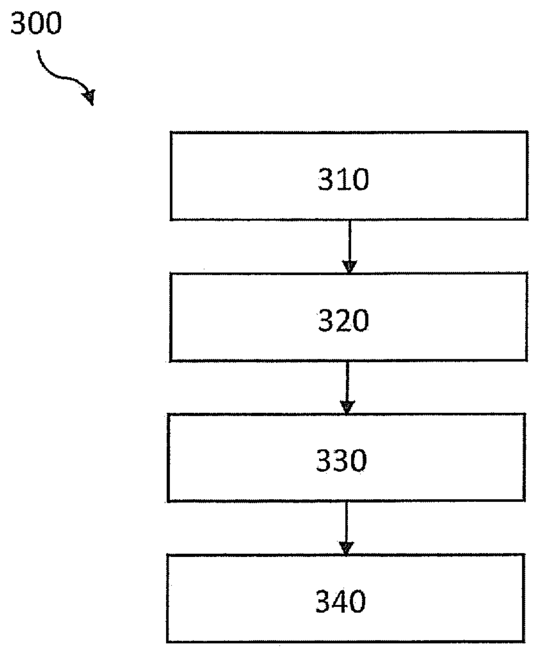
FIG. 6 shows schematically a flow diagram of a method for producing a stator arrangement for a radial flux motor.

The present disclosure furthermore relates to a method for producing a stator arrangement 10 for a radial flux motor 100 (see FIG. 6). In particular, the stator arrangement 10 can have some, a plurality or all of the above-explained features. The method comprises the following steps. Providing 310 a stator housing 20 of a motor housing 110 of the radial flux motor 100, the stator housing 20 defining a cylindrical circumferential portion 30 for receiving the stator. Providing 320 a stator 40. Pushing 330 the stator 40 onto the cylindrical circumferential portion 30 and placing a bell-shaped encapsulation thereon such that the stator 40 is completely surrounded by the bell-shaped encapsulation and the stator housing 20. Encapsulating 340 the stator 40 in a horizontal position by filling encapsulation compound between the stator 40 and the stator housing 20 or the bell-shaped encapsulation. In this case, by curing of the encapsulation compound, an encapsulation body 50 is provided which is form-fittingly connected to the stator housing 20 in such a manner that the stator 40 is secured at least in the axial direction 2 in the stator housing 20 by the encapsulation body 50. A horizontal position can be understood here as meaning an orientation of the stator arrangement 10 in which the axial direction 2 is opposed to the weight force (for example a stator arrangement 10 from FIG. 1 rotated by 90° in the clockwise direction). In other words, the weight force in the horizontal position points in the axial direction 2 with respect to the end wall 22.

In refinements of the method, the stator 40 can be wound with electric windings 46 before being pushed 330 onto the cylindrical circumferential portion 30 and can be pushed thereon as a wound stator 40.

In refinements of the method, the wound stator 40 can be potted with the encapsulation compound and thereby fixed in the encapsulation body 50 after the encapsulation compound has cured.

In refinements of the method, the encapsulation compound can be cast into one or more depressions 32, 23, 34, 25, 36 which are recessed into the stator housing 20, in order, after the curing of the encapsulation compound, to produce the form-fitting connection to the stator housing 20. In particular, one or more undercuts 52, 53, 54, 55, 56 can be formed in the process.

In refinements of the method, a resin material can be used as the encapsulation compound. In particular, a synthetic resin material can be used as the encapsulation compound. The resin material or the synthetic resin material can optionally be provided with fillers promoting heat conduction.

Although the present invention has been described above and is defined in the attached claims, it should be understood that the invention can alternatively also be defined in accordance with the following embodiments:

1. A stator arrangement (10) for a radial flux motor (100) having an axis of rotation (100*a*), comprising:
   a stator housing (20), the stator housing (20) defining a circumferential portion (30) for receiving the stator, a stator (40), which is arranged on the circumferential portion (30), and an encapsulation body (50), wherein the stator (40) is encapsulated in the stator housing (20) and the encapsulation body (50) is form-fittingly connected to the stator housing (20) in such a manner that the stator (40) is secured at least in the axial direction (2) in the stator housing (20) by the encapsulation body (50).

2. The stator arrangement (10) according to embodiment 1, wherein the encapsulation body (50) is form-fittingly connected to the stator housing (20) via one or more undercuts (52, 53, 54, 55, 56) in order to secure the stator (40) in the axial direction (2).

3. The stator arrangement (10) according to embodiment 2, wherein at least one of the one or more undercuts (52, 53, 54, 55, 56) are formed in the circumferential portion (30).

4. The stator arrangement (10) according to any one of the preceding embodiments, wherein the stator housing (20) has an axial end wall (22) which extends away from the circumferential portion (30) in the radial direction (4), and wherein the encapsulation body (50) extends in the axial direction (2) from the stator (40) to the axial end wall (22).

5. The stator arrangement (10) according to embodiment 4, if at least dependent on embodiment 2, wherein at least one of the one or more undercuts (52, 53, 54, 55, 56) is formed in the axial end wall (22) and/or in the circumferential portion (30).

6. The stator arrangement (10) according to either one of embodiments 4 and 5, wherein the axial end wall (22) is substantially annular.

7. The stator arrangement (10) according to any one of the preceding embodiments, wherein the circumferential portion (30) is a first circumferential portion (30), wherein the stator housing (20) furthermore comprises a second circumferential portion (24) which is spaced apart from the first circumferential portion (30) in the radial direction (4), and wherein the encapsulation body (50) extends in the radial direction (4) from the first circumferential portion (30) to the second circumferential portion (24).

8. The stator arrangement (10) according to embodiment 7, if at least dependent on embodiment 2, wherein at least one of the one or more undercuts (52, 53, 54, 55, 56) is formed in the second circumferential portion (24).

9. The stator arrangement (10) according to either one of embodiments 7 and 8, if at least dependent on embodiment 4, wherein the first circumferential portion (30) and/or the second circumferential portion (24) extend away from the axial end wall (22) in the axial direction (2).

10. The stator arrangement (10) according to any one of embodiments 7 to 9, if at least dependent on embodiment 2, wherein at least one of the one or more undercuts (52, 53, 54, 55, 56) is formed by a surface, which is inclined with respect to the axis of rotation (100*a*), in the first circumferential portion (30) and/or the second circumferential portion (24).

11. The stator arrangement (10) according to any one of the preceding embodiments, if at least dependent on embodiment 2, wherein at least one of the one or more undercuts (52, 53, 54, 55, 56) is formed by a depression (32, 23, 34, 25, 36) in the stator housing (20), in which depression the encapsulation body (50) engages.

12. The stator arrangement (10) according to embodiment 11, wherein the depression (32, 23, 34, 25, 36) is groove-shaped.

13. The stator arrangement (10) according to either one of embodiments 11 and 12, wherein the depression extends substantially annularly in the circumferential direction (6) in the stator housing (20).

14. The stator arrangement (10) according to embodiment 13, wherein the depression (32, 23, 34, 25, 36) extends over a range of approximately 5° to approximately 360°.

15. The stator arrangement (10) according to any one of the preceding embodiments, wherein the stator (40) is arranged so as to be at least partially in contact in the radial direction (4) with the circumferential portion (30).

16. The stator arrangement (10) according to any one of the preceding embodiments, wherein the circumferential portion (30) comprises at least one web (35, 37) on which the stator (40) is arranged so as to be at least partially in contact therewith in the radial direction (4).

17. The stator arrangement (10) according to embodiment 16, wherein the at least one web (35, 37) extends in the circumferential direction (6).

18. The stator arrangement (10) according to either one of embodiments 16 and 17, wherein the circumferential portion (30) comprises two axially spaced-apart webs (35, 37) for receiving the stator.

19. The stator arrangement (10) according to embodiment 18, wherein a depression (34) is formed between the two webs (35, 37), into which depression the encapsulation body projects and forms an undercut (54).

20. The stator arrangement (10) according to embodiment 19, wherein the depression (34) extends annularly in the circumferential direction (4).

21. The stator arrangement (10) according to either one of embodiments 19 and 20, wherein the depression (34) extends in the axial direction (2) over at least 25%, preferably over at least 50%, and particularly preferably over at least 75% of an entire axial width of a stator laminated core (42) of the stator (40).

22. The stator arrangement (10) according to any one of the preceding embodiments, wherein the stator (40) is arranged in contact in the axial direction (2) with a radially protruding offset (33) of the circumferential portion (30).

23. The stator arrangement (10) according to embodiment 22, wherein the offset (33) extends at least partially in the circumferential direction (4), in particular completely in the circumferential direction (4).

24. The stator arrangement (10) according to any one of the preceding embodiments, furthermore comprising a rotation lock (70) which is formed by engagement of the stator (40) and/or of the encapsulation body (50) in the stator housing (20).

25. The stator arrangement (10) according to embodiment 24, wherein the rotation lock (70) is formed by at least one groove (72) which extends in the axial direction (2) in the circumferential portion (30) and in which the stator (40) and/or the encapsulation body (50) engages.

26. The stator arrangement (10) according to any one of the preceding embodiments, wherein the stator (40) comprises an annular stator laminated core (42) with a plurality of stator teeth and a plurality of electric windings (46) which are in each case wound around the stator teeth.

27. The stator arrangement (10) according to embodiment 26, wherein the stator (40) furthermore comprises a casing (44) which is arranged between the stator laminated core (42) and the electric windings (46).
28. The stator arrangement (10) according to embodiment 27, wherein the casing (44) comprises a first axial end cap (44*a*) and a second axial end cap (44*b*) which are arranged at opposite axial ends of the stator laminated core (42).
29. The stator arrangement (10) according to any one of embodiments 26 to 28, furthermore comprising an interconnecting disc (48) which is designed for guiding the electric windings (46) away from the stator (40).
30. The stator arrangement (10) according to embodiment 29, if at least dependent on embodiment 4, wherein the interconnecting disc (48) is arranged axially between the stator (40) and the axial end wall (22) and/or is embedded in the encapsulation body (50).
31. The stator arrangement (10) according to any one of the preceding embodiments, wherein the encapsulation body (50) comprises a resin material, in particular a synthetic resin material.
32. A radial flux motor (100) for a fan (1), comprising:
    a motor housing (110),
    a shaft (120), which is mounted rotationally in the motor housing (110),
    a rotor (130), which is arranged for conjoint rotation on the shaft (120) in the motor housing (110),
    a stator arrangement (110) according to any one of the preceding embodiments, wherein the stator (40) is arranged radially adjacent to the rotor (130) in the motor housing (110).
33. The radial flux motor (100) according to embodiment 32, wherein the rotor (130) is formed externally and comprises a plurality of permanent magnets (132) which are arranged distributed in the circumferential direction (6) on a rotor body (134) of the rotor (130).
34. The radial flux motor (100) according to either one of embodiments 32 and 33, wherein the motor housing (110) comprises a rotor housing (112) and the stator housing (20), wherein the rotor housing (112) and the stator housing (20) are interconnected with a force fit.
35. A high-voltage fan (1), comprising:
    a radial flux motor (100) according to any one of embodiments 32 to 34, and
    a fan impeller (200) which is arranged for conjoint rotation on the shaft (120), outside the motor housing (110).
36. A cooling system for a fuel cell drive or a battery-electric drive, comprising
    a cooling circuit,
    a heat exchanger, and
    a high-voltage fan (1) according to embodiment 35, which is designed and arranged to extract heat from the cooling circuit via the heat exchanger.
37. A method (300) for producing a stator arrangement (10) for a radial flux motor (100), comprising the steps of:
    providing (310) a stator housing (20) of a motor housing (110) of the radial flux motor (100), the stator housing (20) defining a circumferential portion (30) for receiving the stator,
    providing (320) a stator (40),
    pushing (330) the stator (40) onto the circumferential portion (30) and placing a bell-shaped encapsulation thereon such that the stator (40) is completely surrounded by the bell-shaped encapsulation and the stator housing (30),
    encapsulating (340) the stator (40) in a horizontal position by filling encapsulation compound between the stator (40) and the stator housing (20) and/or the bell-shaped encapsulation, as a result of which, by curing of the encapsulation compound, an encapsulation body (50) is provided which is form-fittingly connected to the stator housing (20) in such a manner that the stator (40) is secured at least in the axial direction (2) in the stator housing (20) by the encapsulation body (50).
38. The method according to embodiment 37, wherein the stator is wound with electric windings (46) before being pushed (330) onto the circumferential portion (30) and is pushed thereon as a wound stator (40).
39. The method according to embodiment 38, wherein the wound stator (40) is potted with the encapsulation compound and is thereby fixed in the encapsulation body (50) after the curing of the encapsulation compound.
40. The method according to any one of embodiments 37 to 39, wherein the encapsulation compound is cast into one or more depressions (32, 23, 34, 25, 36) which are recessed in the stator housing (20), in order, after the curing of the encapsulation compound, to produce the form-fitting connection to the stator receiving portion (30).
41. The method according to any one of embodiments 37 to 40, wherein a resin material, in particular a synthetic resin material, which is optionally provided with fillers promoting heat conduction is used as the encapsulation compound.

LIST OF REFERENCE SIGNS

1 fan
2 axial direction
4 radial direction
6 circumferential direction
10 stator arrangement
20 stator housing
22 axial end wall
23 depression axial end wall
24 second circumferential portion
25 depression second circumferential portion
30 first circumferential portion
32 depression first end
33 axial stop
34 intermediate web depression
35 first web
36 depression second end
37 second web
40 stator
42 laminated core
44 casing
44*a*, 44*b* first and second end cap
46 electric windings
48 interconnecting disc
50 encapsulation body
52 undercut first circumferential portion first end region
53 undercut axial end wall
54 undercut first circumferential portion intermediate web region
55 undercut second circumferential portion

56 undercut first circumferential portion second end region
60 cooling device
70 rotation lock
100 radial flux motor
100*a* axis of rotation
110 motor housing
112 rotor housing
120 Shaft
122 Bearing
130 rotor
132 rotor magnet
134 rotor body
200 fan impeller

The invention claimed is:

1. A stator arrangement (10) for a radial flux motor (100) having an axis of rotation (100*a*), comprising:
- a stator housing (20), the stator housing (20) defining a circumferential portion (30) for receiving the stator,
- a stator (40), which is arranged with an inner circumferential surface of the stator (40) on a radially outer surface the circumferential portion (30) of the stator housing (20), and
- an encapsulation body (50),
- wherein the stator (40) is encapsulated in the stator housing (20), and the encapsulation body (50) is form-fittingly connected to the stator housing (20) in such a manner that the stator (40) is secured at least in the axial direction (2) in the stator housing (20) by the encapsulation body (50),
- wherein the encapsulation body (50) is form-fittingly connected to the stator housing (20) via one or more undercuts (52, 53, 54, 55, 56) in order to secure the stator (40) in the axial direction (2),
- wherein the stator housing (20) comprises an axial end wall (22) which extends away from the circumferential portion (30) in the radial direction (4), and wherein the encapsulation body (50) extends in the axial direction (2) from the stator (40) to the axial end wall (22), and
- wherein at least one of the one or more undercuts (52, 53, 54, 55, 56) is formed in the circumferential portion (30),
- wherein the circumferential portion (30) is a first circumferential portion (30), wherein the stator housing (20) furthermore comprises a second circumferential portion (24) which is arranged spaced apart in the radial direction (4) from the first circumferential portion (24), and wherein the encapsulation body (50) extends in the radial direction (4) from the first circumferential portion (30) to the second circumferential portion (24), and
- wherein at least one of the one or more undercuts (52, 53, 54, 55, 56) is formed in the second circumferential portion (24).

2. The stator arrangement (10) as claimed in claim 1, wherein at least one of the one or more undercuts (52, 53, 54, 55, 56) is formed by a surface, which is inclined with respect to the axis of rotation (100*a*), in the first circumferential portion (30) and/or the second circumferential portion (24).

3. The stator arrangement (10) as claimed in claim 1, wherein the stator (40) is arranged in contact in the axial direction (2) with a radially protruding offset (33) of the circumferential portion (30).

4. The stator arrangement (10) as claimed in claim 1, furthermore comprising a rotation lock (70) which is formed by engagement of the stator (40) and/or of the encapsulation body (50) in the stator housing (20).

5. The stator arrangement (10) as claimed in claim 1, wherein the encapsulation body (50) comprises a resin material.

6. The stator arrangement (10) as claimed in claim 1, produced by a process comprising the steps of:
- providing (310) a stator housing (20) of a motor housing (110) of the radial flux motor (100), the stator housing (20) defining a circumferential portion (30) for receiving the stator,
- providing (320) a stator (40),
- pushing (330) the stator (40) onto the circumferential portion (30) and placing a bell-shaped encapsulation thereon such that the stator (40) is completely surrounded by the bell-shaped encapsulation and the stator housing (20), and
- encapsulating (340) the stator (40) in a horizontal position by filling encapsulation compound between the stator (40) and the stator housing (20) and/or the bell-shaped encapsulation, as a result of which, by curing of the encapsulation compound, an encapsulation body (50) is provided which is form-fittingly connected to the stator housing (20) in such a manner that the stator (40) is secured at least in the axial direction (2) in the stator housing (20) by the encapsulation body (50).

7. The stator arrangement (10) as claimed in claim 1, wherein at least one of the one or more undercuts (52, 53, 54, 55, 56) is formed in the axial end wall (22).

8. The stator arrangement (10) as claimed in claim 1, wherein the encapsulation body (50) comprises a synthetic resin material.

9. A stator arrangement (10) for a radial flux motor (100) having an axis of rotation (100*a*), comprising:
- a stator housing (20), the stator housing (20) defining a circumferential portion (30) for receiving the stator,
- a stator (40), which is arranged on the circumferential portion (30), and
- an encapsulation body (50),
- wherein the stator (40) is encapsulated in the stator housing (20) and the encapsulation body (50) is form-fittingly connected to the stator housing (20) in such a manner that the stator (40) is secured at least in the axial direction (2) in the stator housing (20) by the encapsulation body (50),
- wherein the circumferential portion (30) comprises at least one web (35, 37) on which the stator (40) is arranged so as to be at least partially in contact therewith in the radial direction (4),
- wherein the circumferential portion (30) comprises two axially spaced-apart webs (35, 37) for receiving the stator, and
- wherein a depression (34) into which the encapsulation body (50) projects and forms an undercut (54) is formed between the two webs (35, 37), and wherein the depression (34) extends in the axial direction (2) over at least 25% of an entire axial width of a stator laminated core (42) of the stator (40).

10. The stator arrangement (10) as claimed in claim 9, produced by a process comprising the steps of:
- providing (310) a stator housing (20) of a motor housing (110) of the radial flux motor (100), the stator housing (20) defining a circumferential portion (30) for receiving the stator,
- providing (320) a stator (40),
- pushing (330) the stator (40) onto the circumferential portion (30) and placing a bell-shaped encapsulation thereon such that the stator (40) is completely surrounded by the bell-shaped encapsulation and the stator housing (20), and encapsulating (340) the stator (40) in a horizontal position by filling encapsulation compound between the stator (40) and the stator housing (20) and/or the bell-shaped encapsulation, as a result of which, by curing of the encapsulation compound, an encapsulation body (50) is provided which is form-fittingly connected to the stator housing (20) in such a manner that the stator (40) is secured at least in the axial direction (2) in the stator housing (20) by the encapsulation body (50).

11. A radial flux motor (100) for a fan (1), comprising:

a motor housing (110), a shaft (120), which is mounted rotationally in the motor housing (110), a rotor (130), which is arranged for conjoint rotation on the shaft (120) in the motor housing (110), a stator arrangement (10) having an axis of rotation (100*a*), comprising:

a stator housing (20), the stator housing (20) defining a circumferential portion (30) for receiving the stator, a stator (40), which is arranged on the circumferential portion (30), and an encapsulation body (50), wherein the stator (40) is encapsulated in the stator housing (20) and the encapsulation body (50) is form-fittingly connected to the stator housing (20) in such a manner that the stator (40) is secured at least in the axial direction (2) in the stator housing (20) by the encapsulation body (50), wherein the encapsulation body (50) is form-fittingly connected to the stator housing (20) via one or more undercuts (52, 53, 54, 55, 56) in order to secure the stator (40) in the axial direction (2), wherein the circumferential portion (30) is a radially inner circumferential portion (30), wherein the stator housing (20) furthermore comprises a radially outer circumferential portion (24) which is arranged spaced apart in the radial direction (4) from the radially inner circumferential portion (30), and wherein the encapsulation body (50) extends in the radial direction (4) from the radially inner circumferential portion (30) to the radially outer circumferential portion (24), wherein at least one of the one or more undercuts (52, 53, 54, 55, 56) is formed in the radially outer circumferential portion (24), wherein the stator (40) is arranged radially adjacent to the rotor (130) in the motor housing (110), and wherein the rotor (130) is formed externally and comprises a plurality of permanent magnets (132) which are arranged distributed in the circumferential direction (6) on a rotor body (134) of the rotor (130).

12. A high-voltage fan (1), comprising:

a radial flux motor (100) as claimed in claim 11, and a fan impeller (200) which is arranged for conjoint rotation on the shaft (120), outside of the motor housing (110).

13. A cooling system for a fuel cell drive or a battery-electric drive, comprising a cooling circuit, a heat exchanger, and a high-voltage fan (1) as claimed in claim 12, which is designed and arranged to extract heat from the cooling circuit via the heat exchanger.

14. The radial flux motor (100) as claimed in claim 12, wherein the stator arrangement (10) is produced by a process comprising the steps of:

providing (310) a stator housing (20) of a motor housing (110) of the radial flux motor (100), the stator housing (20) defining a circumferential portion (30) for receiving the stator, providing (320) a stator (40), pushing (330) the stator (40) onto the circumferential portion (30) and placing a bell-shaped encapsulation thereon such that the stator (40) is completely surrounded by the bell-shaped encapsulation and the stator housing (20), and encapsulating (340) the stator (40) in a horizontal position by filling encapsulation compound between the stator (40) and the stator housing (20) and/or the bell-shaped encapsulation, as a result of which, by curing of the encapsulation compound, an encapsulation body (50) is provided which is form-fittingly connected to the stator housing (20) in such a manner that the stator (40) is secured at least in the axial direction (2) in the stator housing (20) by the encapsulation body (50).

* * * * *